United States Patent
Isaacson et al.

(10) Patent No.: US 12,527,958 B2
(45) Date of Patent: Jan. 20, 2026

(54) DYNAMICALLY OPTIMIZED EVOKED RESPONSE SENSING

(71) Applicant: Medtronic, Inc., Minneapolis, MN (US)

(72) Inventors: Benjamin P. Isaacson, Mahtomedi, MN (US); David A. Dinsmoor, North Oaks, MN (US); Leonid M. Litvak, Bet Shemesh (IL); Kristin N. Hageman, Dayton, MN (US); Hank Bink, Golden Valley, MN (US)

(73) Assignee: Medtronic, Inc., Minneapolis, MN (US)

( * ) Notice: Subject to any disclaimer, the term of this patent is extended or adjusted under 35 U.S.C. 154(b) by 256 days.

(21) Appl. No.: 18/341,025

(22) Filed: Jun. 26, 2023

(65) Prior Publication Data

US 2024/0001125 A1   Jan. 4, 2024

Related U.S. Application Data

(60) Provisional application No. 63/367,374, filed on Jun. 30, 2022.

(51) Int. Cl.
*A61N 1/36* (2006.01)
*A61B 5/294* (2021.01)
(Continued)

(52) U.S. Cl.
CPC ..... *A61N 1/36139* (2013.01); *A61N 1/36146* (2013.01)

(58) Field of Classification Search
CPC ....... A61B 5/0031; A61B 5/349; A61B 5/364; A61B 5/7221; A61B 5/7225;
(Continued)

(56) References Cited

U.S. PATENT DOCUMENTS 6,192,275 B1   2/2001   Zhu et al.
9,265,431 B2   2/2016   Hincapie Ordonez et al.
(Continued)

OTHER PUBLICATIONS

Response to Extended Search Report dated Nov. 28, 2023, from counterpart European Application No. 23182273.5 filed Jun. 26, 2024, 15 pp.
(Continued)

*Primary Examiner* — Jon Eric C Morales
(74) *Attorney, Agent, or Firm* — Shumaker & Sieffert, P.A.

(57) ABSTRACT

Example devices and techniques for improving signal quality of a sensed evoked response signal include processing circuitry communicatively coupled to stimulation generation circuitry and sensing circuitry. The processing circuitry is configured to control the stimulation generation circuitry to generate a stimulation signal and receive from the sensing circuitry the sensed evoked response signal. The processing circuitry is configured to determine that a characteristic value of at least one of the artifact or the sensed evoked response signal meets a threshold and automatically change, based on the determination that the characteristic value of the at least one of an artifact in the sensed evoked response signal or the sensed evoked response signal meets the threshold, at least one sensing parameter.

18 Claims, 9 Drawing Sheets

(51) Int. Cl.
*A61B 5/388* (2021.01)
*A61N 1/372* (2006.01)
(58) Field of Classification Search
CPC .... A61B 5/7264; A61N 1/3627; A61N 1/365; A61N 1/36507; A61N 1/36843; A61N 1/3688; A61N 1/3704
See application file for complete search history.

(56) References Cited

U.S. PATENT DOCUMENTS

| | | |
|---|---|---|
| 2004/0088018 A1 | 5/2004 | Sawchuk et al. |
| 2020/0009380 A1* | 1/2020 | Casavant ............... A61N 1/365 |
| 2020/0046988 A1 | 2/2020 | Wilkinson et al. |
| 2020/0054879 A1 | 2/2020 | Torgerson |
| 2021/0093215 A1 | 4/2021 | Hopper et al. |
| 2021/0093857 A1 | 4/2021 | Bauer et al. |
| 2021/0138250 A1 | 5/2021 | Esteller et al. |
| 2021/0154478 A1 | 5/2021 | Hincapie Ordonez et al. |
| 2021/0187302 A1 | 6/2021 | Pulliam et al. |

OTHER PUBLICATIONS

Kumsa et al., "Electron Transfer Processes Occurring on Platinum Neural Stimulating Electrodes: a Tutorial on the i (Ve) Profile," Journal of Neural Engineering, vol. 13, No. 5, Oct. 2016, 15 pp.
U.S. Appl. No. 18/546,917, by Dinsmoor et al., filed Feb. 21, 2022.
Extended Search Report from counterpart European Application No. 23182273.5 dated Nov. 28, 2023, 6 pp.

* cited by examiner

DYNAMICALLY OPTIMIZED EVOKED RESPONSE SENSING

CROSS-REFERENCE TO RELATED APPLICATION

This application claims the benefit of and priority to U.S. Provisional Patent Application No. 63/367,374 filed Jun. 30, 2022, the entire disclosure of which is incorporated by reference herein.

TECHNICAL FIELD

This disclosure generally relates to medical devices, and more specifically, to devices configured to sense bioelectrical signals.

BACKGROUND

Medical devices may be external or implanted and may be used to deliver electrical stimulation therapy to patients via various tissue sites to treat a variety of symptoms or conditions such as chronic pain, tremor, Parkinson's disease, epilepsy, urinary or fecal incontinence, sexual dysfunction, obesity, or gastroparesis. A medical device may deliver electrical stimulation therapy via one or more leads that include electrodes located proximate to target locations associated with the spinal cord, the brain, pelvic nerves, peripheral nerves, or the gastrointestinal tract of a patient. Stimulation proximate the spinal cord, proximate the sacral nerve, within the brain, and proximate peripheral nerves are often referred to as spinal cord stimulation (SCS), sacral neuromodulation (SNM), deep brain stimulation (DBS), and peripheral nerve stimulation (PNS), respectively.

Electrical stimulation may be delivered to a patient by the medical device in a train of electrical pulses, and parameters of the electrical pulses may include a frequency, an amplitude, a pulse width, and a pulse shape. An evoked compound action potential (ECAP) is a synchronous firing of a population of neurons which occurs in response to the application of a stimulus including, in some cases, an electrical stimulus by a medical device. The ECAP may be detectable as being a separate event from the stimulus itself, and the ECAP may reveal characteristics of the effect of the stimulus on the nerve fibers.

Evoked response style sensing (e.g., electrically evoked compound action potential (EECAP), evoked resonant neural activity (ERNA), etc.) has proven to be useful in assessing dosing response for neuromodulation therapies as well as potentially giving insights into a disease state of a patient. This sensed data may serve as control signals for closed loop stimulation therapies.

SUMMARY

Traditionally, the parameters that define sensing of bioelectric signals (e.g., data acquisition) have largely been static. As the state of an implantable medical device (IMD), such as a neurostimulation device, and the disease state of the patient changes, it may be desirable to be able to automatically change the sensing parameters, stimulation parameters, or the manner in which a characteristic value of a sensed signal is determined to acquire as much meaningful data as possible and ensure that closed loop stimulation being informed by the sensing parameters is still effective and comfortable for the patient. The acquisition of the sensed data may be compromised if the sensing parameters or other parameters are not selected based on the conditions of the IMD and the patient or changes of such conditions over time. The techniques of this disclosure include dynamically and automatically changing the evoked response sensing modality such as by changing sensing parameters, changing stimulation parameters, changing the manner in which a characteristic value of an artifact and/or a sensed evoked response signal is determined, changing a parameter in response to changes to the evoked response, changing a parameter in patient disease state, and/or changing an aspect of the stimulation being delivered.

An IMD may include or be attached to, via one or more leads, a number of electrodes which may be selectively used as stimulation electrodes for delivering an electrical stimulation signal to anatomy of a patient and/or as sensing electrodes for sensing an evoked response from the delivery of the electrical stimulation signal to the patient. The automatic changing of the modality of sensing may include changing sensing parameters, such as which electrode(s) are sensing electrodes, changing a sensing window, changing filtering, and/or changing amplification, changing stimulation parameters, or changing the manner in which a characteristic value is determined in an effort to improve the quality of the sensed evoked response signal.

In general, systems, devices, and techniques are described for systems, devices, and techniques for dynamically changing sensing parameters are disclosed herein.

An example device includes stimulation generation circuitry configured to generate a stimulation signal, according to a set of stimulation parameters, to be delivered to target anatomy of a patient via a stimulation electrode configuration from a plurality of electrodes; sensing circuitry configured to sense an evoked response signal responsive to the stimulation signal according to a set of sensing parameters, the set of sensing parameters defining at least a sensing electrode configuration from the plurality of electrodes; processing circuitry communicatively coupled to the stimulation generation circuitry and the sensing circuitry, the processing circuitry being configured to: control the stimulation generation circuitry to generate the stimulation signal; receive from the sensing circuitry the sensed evoked response signal; determine that a characteristic value of at least one of an artifact or the sensed evoked response signal meets a threshold; and automatically change, based on the determination that the characteristic value of the at least one of the artifact or the sensed evoked response signal meets the threshold, at least one of the sensing parameters.

An example method includes controlling, by processing circuitry, stimulation generation circuitry to generate a stimulation signal, according to a set of stimulation parameters, to be delivered to target anatomy of a patient via a stimulation electrode configuration from a plurality of electrodes; receiving, by processing circuitry and from sensing circuitry, a sensed evoked response signal responsive to the stimulation signal, the sensing circuitry sensing the sensed evoked response signal according to a set of sensing parameters defining at least a sensing electrode configuration from the plurality of electrodes; determining, by the processing circuitry, that a characteristic value of at least one of an artifact or the sensed evoked response signal meets a threshold; and automatically changing, by the processing circuitry and based on the determination that the characteristic value of the at least one of the artifact or the sensed evoked response signal meets the threshold, at least one of the sensing parameters.

An example non-transitory computer readable medium includes instructions, which, when executed, cause processing circuitry to: control stimulation generation circuitry to generate a stimulation signal according to a set of stimulation parameters, to be delivered to target anatomy of a patient via a stimulation electrode configuration from a plurality of electrodes, receive from sensing circuitry, a sensed evoked response signal responsive to the stimulation signal, the sensing circuitry sensing the sensed evoked response signal according to a set of sensing parameters defining at least a sensing electrode configuration from the plurality of electrodes; determine that a characteristic value of at least one of an artifact or the sensed evoked response signal meets a threshold; and automatically change, based on the determination that the characteristic value of the at least one of the artifact or the sensed evoked response signal meets the threshold, at least one of the sensing parameters.

The summary is intended to provide an overview of the subject matter described in this disclosure. It is not intended to provide an exclusive or exhaustive explanation of the systems, device, and methods described in detail within the accompanying drawings and description below. Further details of one or more examples of this disclosure are set forth in the accompanying drawings and in the description below. Other features, objects, and advantages will be apparent from the description and drawings, and from the claims.

DETAILED DESCRIPTION

Figure 1:
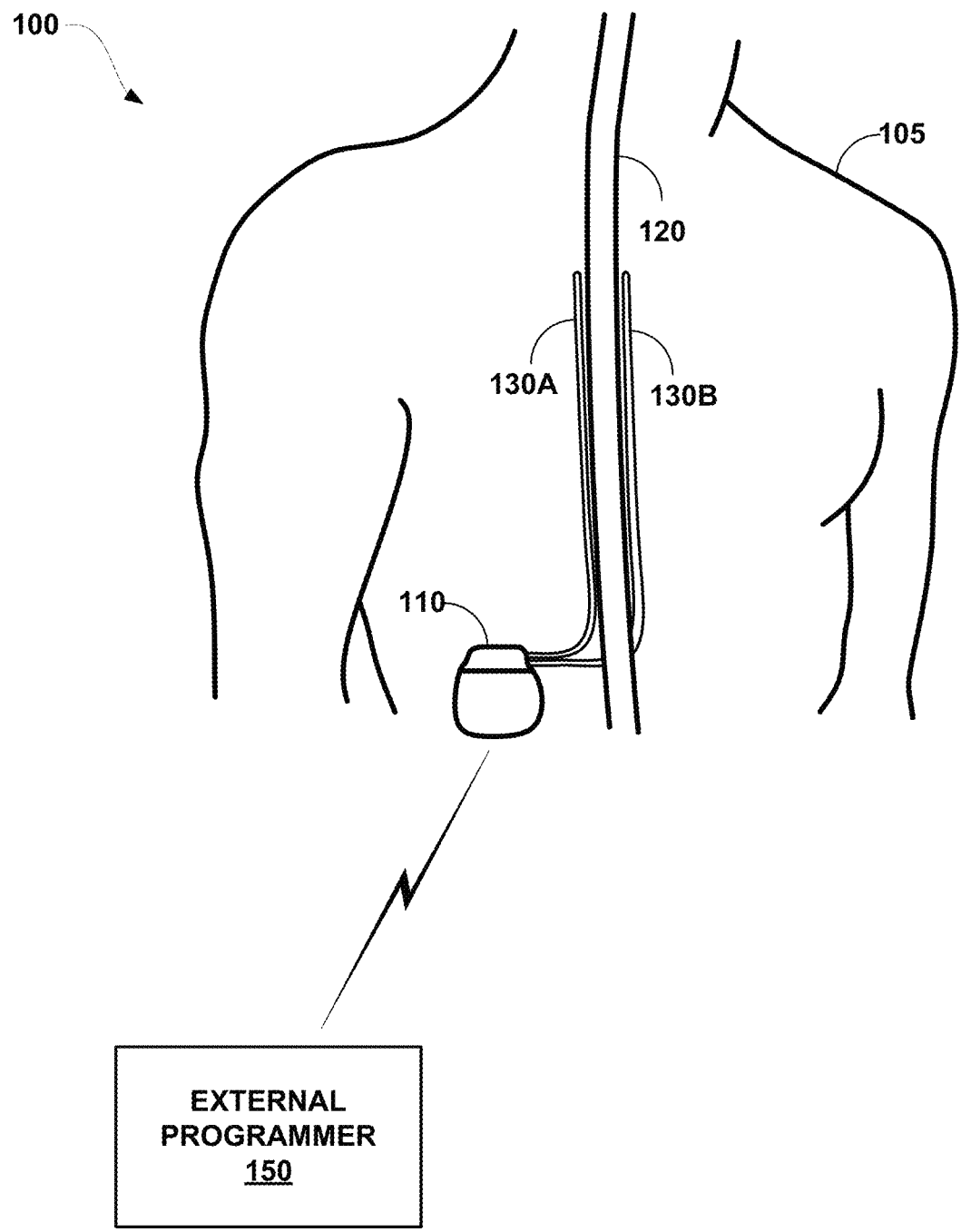
FIG. 1 is a conceptual diagram illustrating an example system that includes an implantable medical device (IMD) configured to deliver spinal cord stimulation (SCS) therapy and an external programmer, in accordance with one or more techniques of this disclosure.

The disclosure describes examples of medical devices, systems, and techniques for dynamically and automatically optimizing sensing parameters, stimulation parameters, or a manner in which a characteristic value is determined, for an IMD, such as for closed loop neurostimulation in an effort to improve a signal quality of a sensed evoked response signal.

Electrical stimulation therapy is typically delivered to a target tissue (e.g., nerves of the spinal cord or muscle) of a patient via two or more electrodes. Parameters of the electrical stimulation therapy (e.g., electrode combination, polarity of the electrodes, voltage or current amplitude, pulse width, pulse frequency, pulse shape, number of interleaved pulses, passive recharge settings, etc.) are selected by a clinician and/or the patient to provide relief from various symptoms, such as pain, nervous system disorders, muscle disorders, etc. Various thresholds, such as a perception threshold and/or discomfort threshold may be determined for the patient and used to select and/or recommend various stimulation parameters of the stimulation therapy.

Evoked responses are a measure of neural recruitment because each evoked response signal represents the superposition of electrical potentials generated from a population of excitable tissue (such as nerve axons) firing in response to an electrical stimulus (e.g., a stimulation pulse). Changes in a characteristic (e.g., an amplitude of a portion of the signal (e.g., a peak-to-peak amplitude) or area under the curve of the signal) of an evoked response signal occur as a function of how many axons have been activated by the delivered stimulation pulse. For a given set of stimulation parameter values that define the stimulation signal and a given distance between the electrodes and target nerve, the detected evoked response signal may have a certain characteristic value (e.g., peak-to-peak amplitude).

In some examples, effective stimulation therapy may rely on a certain level of neural recruitment at a target nerve. This effective stimulation therapy may provide relief from one or more conditions (e.g., patient perceived pain) without an unacceptable level of side effects (e.g., overwhelming perception of stimulation).

Although the system may adjust one or more stimulation parameters according to the one or more characteristics of the sensed evoked response signal, for example, to compensate for the change in distance between electrodes and nerves, the precision of such adjustments is dependent on accurately determining the characteristics of the evoked response signal. For example, noise such as stimulation artifacts and/or linear or exponential background noise may interfere with accurate determinations of the magnitude of one or more peaks within the evoked response signal. Stimulation artifacts typically have amplitudes many times that of the evoked response signal and can at least partially overlap with the evoked response from nerves. Inaccurate evoked response characterization can reduce the effectiveness of using evoked response characteristic values for automatically adjusting stimulation parameters and result in less efficacious therapy for the patient. Moreover, manually identifying patient thresholds, such as a perception threshold, can be time consuming and rely on subjective feedback from the patient. Therefore, clinicians may be pressed for time when setting up stimulation, perception thresholds may be inaccurate, and patients may need to return to a clinic in order to update the stimulator programming, for example. These issues may reduce the likelihood that the patient receives efficacious therapy.

In general, it is preferred to improve biopotential sensing by reducing noise and/or maximizing the desired signal. For example, it may be helpful to increase the electrophysiologic component of the evoked response while minimizing any stimulation artifacts. These considerations are particularly important for SCS systems where there are many electrodes on a lead from which to choose to use as stimulation or sensing electrodes. For leads with fewer electrodes, such as conventional 8-contact (1×8) percutaneous leads, there are relatively few options available for electrode combination. For higher density leads, such as a 5-6-5 lead or paddle leads, far more stimulation and sensing combinations are available including transverse combinations.

As described herein, systems, devices, and techniques are described for dynamically changing sensing parameters, such as which electrode(s) are sensing electrodes, changing a sensing window, changing filtering of the evoked response signal, changing amplification of the evoked response signal, and/or changing stimulation parameters so as to adapt sensing to a changing IMD or patient state. For example, the system may attempt to reduce the impact of artifacts on the evoked response signal through changing sensing parameters and/or stimulation parameters. Reducing the impact of the artifacts on the sensed signal may be one example of increasing the sensing capability of the system.

In some examples, the evoked responses detected by an IMD may be evoked responses elicited by stimulation pulses intended to contribute to therapy of a patient or separate pulses (e.g., control pulses) configured to elicit evoked responses that are detectable by the IMD. Nerve impulses detectable as the evoked response signal travel quickly along the nerve fiber after the delivered stimulation pulse first depolarizes the nerve. If the stimulation pulse delivered by first electrodes has a pulse width that is too long, different electrodes configured to sense the evoked response may sense the stimulation pulse itself as an artifact (e.g., detection of delivered charge itself as opposed to detection of a physiological response to the delivered stimulus) that obscures the lower amplitude evoked response signal. However, the evoked response signal loses fidelity as the electrical potentials propagate from the electrical stimulus because different nerve fibers propagate electrical potentials at different speeds and fibers in spine contributing to the evoked response are pruned off. Therefore, sensing the evoked response at a far distance from the stimulation electrodes may avoid the artifact caused by a stimulation pulse with a long pulse width, but the evoked response signal may be too small or lose fidelity needed to detect changes to the evoked response signal that occur when the electrode to target tissue distance changes. In other words, the system may not be able to identify, at any distance from the stimulation electrodes, evoked responses from stimulation pulses configured to provide a therapy to the patient.

Moreover, an IMD and/or lead(s) carrying electrodes used for stimulation and sensing may migrate within the patient, or the patient may change postures placing more or less pressure on areas containing the IMD and/or lead(s) thereby causing the IMD and/or lead(s) to be closer or farther from the target tissue than at other times. Additionally, a patient disease state may change over time. Therefore, it may be desirable to dynamically and automatically change parameters, such as sensing parameters and/or stimulation parameters to more accurately identify the evoked response and thereby configure the electrical stimulation in a closed loop manner to deliver more efficacious therapy.

FIG. 1 is a conceptual diagram illustrating an example system 100 that includes an implantable medical device (IMD) 110 configured to deliver spinal cord stimulation (SCS) therapy and an external programmer 150, in accordance with one or more techniques of this disclosure. Although the techniques described in this disclosure are generally applicable to a variety of medical devices including external devices and IMDs, application of such techniques to IMDs and, more particularly, implantable electrical stimulators (e.g., neurostimulators) will be described for purposes of illustration. More particularly, the disclosure will refer to an implantable SCS system for purposes of illustration, but without limitation as to other types of medical devices or other therapeutic applications of medical devices.

As shown in FIG. 1, system 100 includes an IMD 110, leads 130A and 130B, and external programmer 150 shown in conjunction with a patient 105, who is ordinarily a human patient. In the example of FIG. 1, IMD 110 is an implantable electrical stimulator that is configured to generate and deliver electrical stimulation therapy to patient 105 via one or more electrodes of electrodes of leads 130A and/or 130B (collectively, "leads 130"), e.g., for relief of chronic pain or other symptoms. In other examples, IMD 110 may be coupled to a single lead carrying multiple electrodes, to more than two leads each carrying multiple electrodes, or to no leads where the electrodes are disposed on the housing of the IMD. In some examples, the stimulation signals, or pulses, may be configured to elicit detectable evoked response signals that IMD 110 may use to determine the posture state occupied by patient 105 and/or determine how to adjust one or more parameters that define stimulation therapy. IMD 110 may be a chronic electrical stimulator that remains implanted within patient 105 for weeks, months, or even years. In other examples, IMD 110 may be a temporary, or trial, stimulator used to screen or evaluate the efficacy of electrical stimulation for chronic therapy. In one example, IMD 110 is implanted within patient 105, while in another example, IMD 110 is an external device coupled to percutaneously implanted leads. In some examples, IMD 110 uses one or more leads, while in other examples, IMD 110 is leadless.

IMD 110 may be constructed of any polymer, metal, or composite material sufficient to house the components of IMD 110 (e.g., components illustrated in FIG. 2A) within patient 105. In this example, IMD 110 may be constructed with a biocompatible housing, such as titanium or stainless steel, or a polymeric material such as silicone, polyurethane, or a liquid crystal polymer, and surgically implanted at a site in patient 105 near the pelvis, abdomen, or buttocks. In other examples, IMD 110 may be implanted within other suitable sites within patient 105, which may depend, for example, on the target site within patient 105 for the delivery of electrical stimulation therapy. The outer housing of IMD 110 may be configured to provide a hermetic seal for components, such as a rechargeable or non-rechargeable power source. In addition, in some examples, the outer housing of IMD 110 is selected from a material that facilitates receiving energy to charge the rechargeable power source.

Electrical stimulation energy, which may be constant current or constant voltage-based pulses, for example, is delivered from IMD 110 to one or more target tissue sites of patient 105 via one or more electrodes (not shown) of implantable leads 130. In the example of FIG. 1, leads 130 carry electrodes that are placed adjacent to the target tissue of spinal cord 120. One or more of the electrodes may be disposed at a distal tip of a lead 130 and/or at other positions at intermediate points along the lead. Leads 130 may be implanted and coupled to IMD 110. The electrodes may transfer electrical stimulation generated by an electrical stimulation generator (e.g., stimulation generation circuitry) in IMD 110 to tissue of patient 105. Although leads 130 may each be a single lead, lead 130 may include a lead extension or other segments that may aid in implantation or positioning of lead 130. In some other examples, IMD 110 may be a leadless stimulator with one or more arrays of electrodes arranged on a housing of the stimulator rather than leads that extend from the housing. In addition, in some other examples, system 100 may include one lead or more than two leads, each coupled to IMD 110 and directed to similar or different target tissue sites.

The electrodes of leads 130 may be electrode pads on a paddle lead, such as a 5-6-5 lead, circular (e.g., ring) electrodes surrounding the body of the lead, conformable electrodes, cuff electrodes, segmented electrodes (e.g., electrodes disposed at different circumferential positions around the lead instead of a continuous ring electrode), any combination thereof (e.g., ring electrodes and segmented electrodes) or any other type of electrodes capable of forming unipolar, bipolar or multipolar electrode combinations for therapy. Ring electrodes arranged at different axial positions at the distal ends of lead 130 will be described for purposes of illustration.

The deployment of electrodes via leads 130 is described for purposes of illustration, but arrays of electrodes may be deployed in different ways. For example, a housing associated with a leadless stimulator may carry arrays of electrodes, e.g., rows and/or columns (or other patterns), to which shifting operations may be applied. Such electrodes may be arranged as surface electrodes, ring electrodes, or protrusions. As a further alternative, electrode arrays may be formed by rows and/or columns of electrodes on one or more paddle leads. In some examples, electrode arrays include electrode segments, which are arranged at respective positions around a periphery of a lead, e.g., arranged in the form of one or more segmented rings around a circumference of a cylindrical lead. In other examples, one or more of leads 130 are linear leads having eight ring electrodes along the axial length of the lead. In another example, the electrodes are segmented rings arranged in a linear fashion along the axial length of the lead and at the periphery of the lead.

The stimulation parameter set of a therapy stimulation program that defines the stimulation signal of electrical stimulation therapy by IMD 110 through the electrodes of leads 130 may include information identifying which electrodes have been selected for delivery of stimulation according to a stimulation program, the polarities of the selected electrodes, i.e., the electrode combination for the program, voltage or current amplitude, pulse frequency, pulse width, pulse shape of stimulation delivered by the electrodes, a number of interleaved pulses, passive recharge settings, etc. These stimulation parameter values that make up the stimulation parameter set that defines the stimulation signal may be predetermined parameter values defined by a user and/or automatically determined by system 100 based on one or more factors or user input.

Although FIG. 1 is directed to SCS therapy, e.g., used to treat pain, in other examples system 100 may be configured to treat any other condition that may benefit from electrical stimulation therapy. For example, system 100 may be used to treat tremor, Parkinson's disease, epilepsy, a pelvic floor disorder (e.g., urinary incontinence or other bladder dysfunction, fecal incontinence, pelvic pain, bowel dysfunction, or sexual dysfunction), obesity, gastroparesis, or psychiatric disorders (e.g., depression, mania, obsessive compulsive disorder, anxiety disorders, and the like). In this manner, system 100 may be configured to provide therapy taking the form of DBS, PNS, PNFS, CS, pelvic floor stimulation, gastrointestinal stimulation, or any other stimulation therapy capable of treating a condition of patient 105.

In some examples, lead 130 includes one or more sensors configured to allow IMD 110 to monitor one or more parameters of patient 105, such as patient activity, pressure, temperature, or other characteristics. The one or more sensors may be provided in addition to, or in place of, therapy delivery by lead 130.

IMD 110 is configured to deliver electrical stimulation therapy to patient 105 via selected combinations of electrodes carried by one or both of leads 130, alone or in combination with an electrode carried by or defined by an outer housing of IMD 110. The target tissue for the electrical stimulation therapy may be any tissue affected by electrical stimulation, which may be in the form of electrical stimulation pulses or continuous waveforms. In some examples, the target tissue includes nerves, smooth muscle, or skeletal muscle of the anatomy of patient 105. In the example illustrated by FIG. 1, the target tissue is tissue proximate spinal cord 120, such as within an intrathecal space or epidural space of spinal cord 120, or, in some examples, adjacent nerves that branch off spinal cord 120. Leads 130 may be introduced into spinal cord 120 in via any suitable region, such as the thoracic, cervical, or lumbar regions. Stimulation of spinal cord 120 may, for example, prevent pain signals from traveling through spinal cord 120 and to the brain of patient 105. Patient 105 may perceive the interruption of pain signals as a reduction in pain and, therefore, efficacious therapy results. In other examples, stimulation of spinal cord 120 may produce paresthesia which may be reduce the perception of pain by patient 105, and thus, provide efficacious therapy results.

IMD 110 is configured to generate and deliver electrical stimulation therapy to a target stimulation site within patient 105 via the electrodes of leads 130 to patient 105 according to one or more therapy stimulation programs. A therapy stimulation program defines values for one or more stimulation parameters (e.g., a stimulation parameter set) that define an aspect of the therapy delivered by IMD 110 according to that program. For example, a therapy stimulation program that controls delivery of stimulation by IMD 110 in the form of pulses may define values for voltage or current pulse amplitude, pulse width, pulse rate (e.g., pulse frequency), electrode combination, pulse shape, number of interleaved pulses, passive recharge settings, etc. for the stimulation signal delivered by IMD 110 according to that program.

Furthermore, IMD 110 may be configured to deliver stimulation to patient 105 via a combination of electrodes of leads 130, alone or in combination with an electrode carried by or defined by an outer housing of IMD 110 in order to detect evoked response signals. The tissue targeted by the stimulation may be the same or similar tissue targeted by the electrical stimulation therapy, but IMD 110 may deliver stimulation pulses for evoked response signal detection via the same, at least some of the same, or different electrodes.

IMD 110 can deliver stimulation to a target stimulation site within patient 105 via the electrodes of leads 130 according to one or more evoked response stimulation programs to develop a growth curve of the evoked response. The one or more evoked response stimulation programs may be stored in a storage device of IMD 110. Each evoked response program of the one or more evoked response stimulation programs includes values for one or more parameters that define an aspect of the stimulation delivered by IMD 110 according to that program, such as current or voltage amplitude, pulse width, pulse frequency, pulse shape, electrode combination, electrode polarity, number of interleaved pulses, passive recharge settings, etc. In some examples, the evoked response stimulation program may also define the number of pulses and parameter values for each pulse of multiple pulses within a pulse sweep configured to obtain a plurality of evoked response signals for respective pulses in order to obtain the growth curve that IMD 110 may use to determine an estimated neural threshold of the patient. In some examples, IMD 110 delivers stimulation to patient 105 according to multiple evoked response stimulation programs. Although these functions are described with respect to IMD 110, other devices, such as external programmer 150, may perform these functions such as determining the estimated neural threshold based on the growth curve of evoked response characteristic values.

A user, such as a clinician or patient 105, may interact with a user interface of an external programmer 150 to program IMD 110. Programming of IMD 110 may refer generally to the generation and transfer of commands, programs, or other information to control the operation of IMD 110. In this manner, IMD 110 may receive the transferred commands and programs from external programmer 150 to control stimulation, such as electrical stimulation therapy to develop the growth curve. For example, external programmer 150 may transmit therapy stimulation programs, evoked response stimulation programs, stimulation parameter adjustments, therapy stimulation program selections, evoked response program selections, user input, or other information to control the operation of IMD 110, e.g., by wireless telemetry or wired connection.

In some cases, external programmer 150 may be characterized as a physician or clinician programmer if it is primarily intended for use by a physician or clinician. In other cases, external programmer 150 may be characterized as a patient programmer if it is primarily intended for use by a patient. A patient programmer may be generally accessible to patient 105 and, in many cases, may be a portable device that may accompany patient 105 throughout the patient's daily routine. For example, a patient programmer may receive input from patient 105 when the patient wishes to terminate or change electrical stimulation therapy, when a patient perceives stimulation being delivered or when a patient terminates due to comfort level. In general, a physician or clinician programmer may support selection and generation of programs by a clinician for use by IMD 110, whereas a patient programmer may support adjustment and selection of such programs by a patient during ordinary use. In other examples, external programmer 150 may include, or be part of, an external charging device that recharges a power source of IMD 110. In this manner, a user may program and charge IMD 110 using one device, or multiple devices.

As described herein, information may be transmitted between external programmer 150 and IMD 110. Therefore, IMD 110 and external programmer 150 may communicate via wireless communication using any techniques known in the art. Examples of communication techniques may include, for example, radiofrequency (RF) telemetry and inductive coupling, but other techniques are also contemplated. In some examples, external programmer 150 includes a communication head that may be placed proximate to the patient's body near the IMD 110 implant site to improve the quality or security of communication between IMD 110 and external programmer 150. Communication between external programmer 150 and IMD 110 may occur during power transmission or separate from power transmission.

In some examples, IMD 110, in response to commands from external programmer 150, delivers electrical stimulation therapy according to a plurality of therapy stimulation programs to a target tissue site of the spinal cord 120 of patient 105 via electrodes (not depicted in FIG. 1) on leads 130. In some examples, IMD 110 modifies therapy stimulation programs as therapy needs of patient 105 evolve over time. For example, the modification of the therapy stimulation programs may cause the adjustment of at least one stimulation parameter of the stimulation signal. When patient 105 receives the same therapy for an extended period, the efficacy of the therapy may be reduced. In some cases, stimulation parameters of the stimulation signal may be automatically updated. In some examples, IMD 110 may detect evoked response signals from the stimulation signal delivered to patient 105 for the purpose of modifying therapy delivered to the patient.

In some examples, efficacy of electrical stimulation therapy may be indicated by one or more characteristics of an action potential that is evoked by a stimulation signal delivered by IMD 110, for example by determining an estimated neural response using the characteristic value of the evoked response signal. Electrical stimulation therapy delivery by leads 130 of IMD 110 may cause neurons within the target tissue to evoke a compound action potential that travels up and down the target tissue, eventually arriving at sensing electrodes of IMD 110. Furthermore, stimulation pulses may also elicit at least one evoked response signal, and evoked responses to stimulation may also be a surrogate for the effectiveness of the therapy and/or the intensity perceived by the patient. The amount of action potentials (e.g., number of neurons propagating action potential signals) that are evoked may be based on the various stimulation parameters of the electrical stimulation signal such as stimulation electrode combination, stimulation electrode polarity, amplitude, pulse width, frequency, pulse shape (e.g., slew rate at the beginning and/or end of the pulse), number of interleaved pulses, passive recharge settings, etc. The slew rate may define the rate of change of the voltage and/or current amplitude of the pulse at the beginning and/or end of each pulse or each phase within the pulse. For example, a very high slew rate indicates a steep or even near vertical edge of the pulse, and a low slew rate indicates a longer ramp up (or ramp down) in the amplitude of the pulse. In some examples, these parameters contribute to an intensity of the electrical stimulation. In addition, a characteristic of the evoked response signal (e.g., an amplitude) may change based on the distance between the stimulation electrodes and the nerves subject to the electrical field produced by the delivered control stimulation pulses.

During delivery of control stimulation pulses defined by one or more evoked response test stimulation programs, IMD 110, via two or more electrodes interposed on leads 130, senses electrical potentials of tissue of the spinal cord 120 of patient 105 to measure the electrical activity of the tissue. IMD 110 senses evoked response from the target tissue of patient 105, e.g., with sensing electrodes on one or more leads 130 and associated sensing circuitry. In some examples, IMD 110 receives a signal indicative of the evoked response from one or more sensors, e.g., one or more electrodes and circuitry, internal or external to patient 105. Such an example signal may include a signal indicating an evoked response of the tissue of patient 105.

In the example of FIG. 1, IMD 110 is described as performing a plurality of processing and computing functions. However, external programmer 150 instead may perform one, several, or all of these functions. In this alternative example, IMD 110 functions to relay sensed signals to external programmer 150 for analysis, and external programmer 150 transmits instructions to IMD 110 to adjust the one or more stimulation parameters defining the electrical stimulation therapy based on analysis of the sensed signals. For example, IMD 110 may relay the sensed signal indicative of an evoked response to external programmer 150. External programmer 150 may compare the parameter value of the evoked response to the target evoked response characteristic value relative to an estimated neural response, and in response to the comparison, external programmer 150 may instruct IMD 110 to adjust one or more stimulation parameter that defines the electrical stimulation signal delivered to patient 105.

In the example techniques described in this disclosure, the stimulation parameters and the target evoked response characteristic may be initially set at the clinic but may be set and/or adjusted at home by patient 105. For example, the target evoked response characteristics may be changed to match, be a fraction of, or a multiplier of, a stimulation threshold. In some examples, target evoked response characteristics may be specific to respective different posture states of the patient. Once the target evoked response characteristic values are set, the example techniques allow for automatic adjustment of parameter values that define stimulation signal to maintain consistent volume of neural activation and consistent perception of therapy for the patient. The ability to change the stimulation parameter values may also allow the therapy to have long term efficacy, with the ability to keep the intensity of the stimulation (e.g., as indicated by the evoked response) consistent by comparing the measured evoked response values to the target evoked response characteristic value. In addition, or alternatively, to maintaining stimulation intensity, IMD 110 may monitor the characteristic values of the evoked response signals to limit one or more parameter values that define the stimulation signal. IMD 110 may perform these changes without intervention by a physician or patient 105. In this manner, IMD 110 may deliver closed loop stimulation therapy.

In some examples, the system changes the target evoked response characteristic value over a period of time, such as according to a change to a stimulation threshold (e.g., a perception threshold or detection threshold). The system may be programmed to change the target evoked response characteristic in order to adjust the intensity of stimulation pulses to provide varying sensations to the patient (e.g., increase or decrease the volume of neural activation). Although the system may change the target evoked response characteristic value, received evoked response signals may still be used by the system to adjust one or more parameter values of the stimulation pulse in order to meet the target evoked response characteristic value.

One or more devices within system 100, such as IMD 110 and/or external programmer 150, may perform various functions as described herein. For example, IMD 110 may include stimulation generation circuitry configured to generate a stimulation signal, according to a set of stimulation parameters, to be delivered to anatomy of a patient via a stimulation electrode configuration from a plurality of electrodes. IMD 110 may include sensing circuitry configured to sense an evoked response signal responsive to the stimulation signal according to a set of sensing parameters, the set of sensing parameters defining at least a sensing electrode configuration from the plurality of electrodes. IMD 110 may include processing circuitry communicatively coupled to the stimulation generation circuitry and the sensing circuitry. As used herein, the processing circuitry being communicatively coupled to the stimulation generation circuitry and the sensing circuitry means that the processing circuitry is coupled to the stimulation generation circuitry and the sensing circuitry in a manner in which processing circuitry may communicate with the stimulation generation circuitry and the sensing circuitry. For example, the processing circuitry may control the stimulation generation circuitry and/ or the sensing circuitry. For example, the processing circuitry may also receive signals from the sensing circuitry. The processing circuitry may be being configured to control the stimulation generation circuitry to generate the stimulation signal and receive from the sensing circuitry the sensed evoked response signal. The processing circuitry may be configured to determine that at least one of an artifact or the sensed evoked response signal meets a threshold and based on the determination that the at least one of the artifact or the sensed evoked response signal meets the threshold, automatically change at least one sensing parameter. By changing at least one sensing parameter, the quality of sensed evoked response signal may be improved thereby improving the efficacy of the closed loop stimulation delivered to patient 105. In some examples, IMD 110 may change at least one sensing electrode of the sensing electrode configuration of electrodes after determining that the characteristic value of the artifact and/or the sensed evoked response meets a threshold.

IMD 110 may make other changes to improve the quality of the sensed evoked response signal. For example, if the characteristic value of at least one of the artifact or the sensed evoked response signal meets the threshold, which may be indicative of a relatively poor signal quality of the sensed evoked response signal, IMD 110 may change, based on the determination that characteristic value of the at least one of the artifact or the sensed evoked response signal meets the threshold, a proximity of at least one sensing electrode to the anatomy of patient 105 (e.g., the target tissue for stimulation), the spacing between the sensing electrodes, and/or the orientation (e.g., the electrode combination) of at least one sensing electrode. For example, IMD 110 may change which electrodes are used as sensing electrodes to change the proximity of the sensing electrodes to the target tissue. In some examples, IMD 110 may iteratively select which electrodes are used as sensing electrodes by backing away in a step-by-step manner from the target tissue (e.g., changing which electrodes are the sensing electrodes to be further from the target tissue). In some examples, IMD 100 may change the orientation (e.g., which segment(s) of a segmented electrode or other electrodes are used to sense) by automatically searching the plurality of electrodes for a sensing electrode combination to determine which electrodes may be used as sensing electrodes that will minimize the impact (e.g., amplitude) of the artifact or to maximize the signal strength of the sensed evoked response signal.

IMD 110 may change sensing parameters, such as how the characteristic value of the sensed evoked response signal is determined in response to the presence or magnitude (e.g., amplitude or area under the curve) of the artifact. For example, IMD 110 may change from determining the characteristic value based on peak-to-peak amplitude of the sensed evoked response signal to determining the characteristic value based on area under the curve. Other potential techniques for determining the characteristic value may include latency of a peak relative to an artifact, latency between peaks, the number of peaks, the slope of the artifact, decay constant of the artifact, polarity of the artifact, and/or other morphology of the artifact or the sensed evoked response signal. For example, when the characteristic value is related to latency, IMD 110 may change a sensing window during which the evoked response signal is sensed, for example, by shifting the window, lengthening the window, or shortening the window.

IMD 110 may include artifact rejection circuitry which may include one or more filters to remove or reduce the impact of any artifact in the sensed evoked response signal.

For example, IMD 110 may adapt stimulation parameters when an artifact in the sensed evoked response signal temporally shifts within a sensing window. IMD 110 may adapt stimulation parameters based on the magnitude (e.g., amplitude or area under the curve) of the artifact, the slope of the artifact, decay constant of the artifact, polarity of the artifact, and/or other morphology of the artifact. IMD 110 may adjust filtering parameters, such as frequency levels or filtering coefficients, based on the magnitude (e.g., amplitude or area under the curve) of the artifact, the slope of the artifact, decay constant of the artifact, polarity of the artifact, and/or other morphology of the artifact. IMD 110 may determine that the artifact and/or the sensed evoked response signal is more than a difference threshold different than an expected evoked response signal and refrain from changing the stimulation parameters based on the sensed evoked response signal (e.g., temporarily stopping the use of closed-loop stimulation, in which case IMD 110 may continue to deliver stimulation using the existing stimulation parameters).

IMD 110 may include amplification circuitry to amplify the sensed evoked response signal. IMD 110 may determine a window, having a time duration, for amplification of the sensed evoked response signal and determine blanking parameters. IMD 110 may weight temporal data within the window and/or may weight calculated features (e.g., within the morphology of the temporal data) of the temporal data within the window. In some examples, the weighting may be different for different portions of the window. For example, the weighting may be configured to emphasize the evoked response or the artifact. IMD 110 may dynamically adjust averaging of the weighted temporal data and/or the weighting of the calculated features of the temporal data based on the artifact or noise within the sensed evoked response signal. In some examples, IMD 110 may adjust the weighting of how consecutive sensed evoked response signals (and/or calculated features thereof) are averaged. For example, more recent sensed evoked response signals may be more heavily weighted than less recent sensed evoked response signals. If a sensed evoked response signal is an outlier (e.g., more than a predetermined difference than an expected sensed evoked response signal or an average of past sensed evoked response signal), IMD 110 may ignore that outlier signal or assign the outlier signal with a weight of 0. In some examples, IMD 110 may use the determined average of the sensed evoked response signals (and/or calculated features thereof) to control the amplification circuitry rather than a single sensed evoked response signal. Such averaging of weighted temporal data (and/or calculated features thereof) may be indicative of the characteristic value of the sensed evoked response itself. In some examples, IMD 110 may adjust a gain setting of the amplification circuitry. For example, if an artifact increases such that saturation occurs, IMD 110 may reduce the gain of the amplification circuitry to avoid saturation and may adjust other parameters to better account for the artifact. In some examples, IMD 110 may calculate features within the morphology of the sensed evoked response signal. In some examples, IMD 110 may adjust a gain or other parameters of the amplification circuitry based on at least one of the calculated features or the weighted calculated features. Such calculated features may include the magnitude (e.g., amplitude or area under the curve) of the artifact, the slope of the artifact, decay constant of the artifact, polarity of the artifact, and/or other morphology of the artifact or of the sensed evoked response signal.

In some examples, IMD 110 may change stimulation parameters in an attempt to improve the quality of the sensed evoked response signal. For example, IMD 110 may, in response to determining that the characteristic value of at least one of the artifact or the sensed evoked response signal meets a threshold, alternate the polarity of the stimulation electrodes and average the sensed evoked response signal over time. For example, IMD 110 may change the polarity of the stimulation electrodes from one polarity to the opposite polarity, back and forth, and average the resulting sensed evoked response signal. In some examples, IMD 110 may also provide a masker pulse which is preceding in time to the stimulation pulse such that the neural response to the stimulation pulse is masked due to neurons being in the refractory period due to their activation in response to the masker pulse. To facilitate this technique, the masker pulse should precede the stimulation pulse by no more than either absolute or relative refractory period of the neural tissue (e.g., 0.3 to 5 msec). Because the neural response is masked, the recording due to pulse following the masked pulse will contain predominantly a stimulation artifact. This recording can then be used to estimate the artifact and subtract the artifact from subsequent stimulation pulses, to achieve a better estimate of underlying neural response.

In some examples, IMD 110 may determine that the amplitude of the artifact has grown and, in response to that determination, change a number of interleaved pulses of the stimulation parameters. An interleaved pulse may be a pulse that is not intended to elicit an evoked response and may be delivered immediately preceding and/or following a stimulation signal or pulse that is intended to elicit an evoked response. For example, if the number of interleaved pulses was previously 10, IMD 110 may increase or decrease that number in an attempt to improve the signal quality of the sensed evoked response signal. In some examples, IMD 110 may change at least one passive recharge setting of the stimulation parameters based on a time constant of the artifact. Passive recharge may be the exponential decay of accumulated charge from a stimulation pulse through DC blocking capacitors and tissue resistance. For example, IMD 110 may change a delay, a duration, truncation, ratio, etc. of passive recharge settings. For example, IMD 110 may shorten a duration of passive recharge based on an artifact trend. In some examples, IMD 110 may change a pulse shape of the stimulation parameters in an attempt to improve the quality of the sensed evoked response signal.

In some examples, IMD 110 may include the stimulation generation circuitry, the sensing circuitry, and the processing circuitry. However, in other examples, one or more additional devices may be part of the system that performs the functions described herein. For example, IMD 110 may include the stimulation generation circuitry and the sensing circuitry, but external programmer 150 or other external device may include the processing circuitry that at least determines the estimated neural threshold of the patient. IMD 110 may transmit the sensed evoked response signals, or data representing the evoked response signal, to external programmer 150, for example. Therefore, the processes described herein may be performed by multiple devices in a distributed system. In some examples, system 100 may include one or more electrodes that deliver and/or sense electrical signals. Such electrodes may be configured to sense the evoked response signals. In some examples, the same electrodes may be configured to sense signals representative of transient movements of the patient. In other examples, other sensors, such as accelerometers, gyroscopes, or other movement sensors may be configured to sense movement of the patient that indicates the patient may have transitioned to a different posture state.

As described herein, the processing circuitry of IMD 110 may be configured to determine characteristic values for each sensed evoked response signals detected after each of the plurality of electrical stimulation pulses. A plurality of stimulation pulses is delivered, where each stimulation pulse may be defined by a different respective value of stimulation parameter, such as an electrode combination. In one or more examples the characteristic value for each evoked response signal is a representation of the evoked response signal according to some metric, and is determined, by IMD 110, for example by removing or reducing an artifact from the sensed evoked response signal. For example, the characteristic value may include an amplitude of the sensed evoked response signal (e.g., a peak-to-peak amplitude), an area under the curve of the sensed evoked response signal within a time window, values based off of the amplitude and/or the area under the curve, or the like. In some examples, processing circuitry of IMD 110 may change the technique to determine the characteristic value based on determining there is an artifact in the sensed evoked response signal or based on determining that a characteristic value of the artifact or sensed evoked response signal is meets a threshold. For example, processing circuitry of IMD 110 may shift the window, shorten the window, lengthen the window, etc. In some examples, IMD 110 may change the window based on a proximity of the sensing electrodes to the target tissue. These characteristic values may thus be used as a metric derived from the evoked response signal the represents the relative nerve fiber activation caused by the delivered stimulation pulse, such as neural activation. In one or more examples, the artifact may be used as the characteristic value, or as a portion of the characteristic value. In this manner, each evoked response signal of the plurality of evoked response signals will be associated with a respective characteristic value of the characteristic values.

In one example, system 100 (which may be or include IMD 110 and/or external programmer 150 or off-site or networked computing systems) may include stimulation generation circuitry configured to deliver a stimulation signal to patient 105 and sensing circuitry configured to sense an evoked response signal evoked from the stimulation signal. System 100 may also include processing circuitry configured to determine evoked response characteristic values for each of the evoked response signals, determine a targeted range of evoked response characteristic values based on the growth curve which is based on the estimated neural response, which may be a range, a characteristic value of the targeted evoked response signal, and at least one parameter value at least partially defining electrical stimulation therapy to be delivered or offered to the patient. The patient or clinician may further modify the stimulation therapy, for example, based on patient preference or expected battery life, for example.

Although in one example IMD 110 takes the form of an SCS device, in other examples, IMD 110 takes the form of any combination of DBS devices, peripheral nerve stimulators, implantable cardioverter defibrillators (ICDs), pacemakers, cardiac resynchronization therapy devices (CRT-Ds), left ventricular assist devices (LVADs), implantable sensors, orthopedic devices, or drug pumps, as examples. Moreover, techniques of this disclosure may be used to determine stimulation thresholds (e.g., perception thresholds and detection thresholds) associated any one of the aforementioned IMDs and then use a stimulation threshold to inform the intensity (e.g., stimulation levels) of therapy.

Figure 2A:
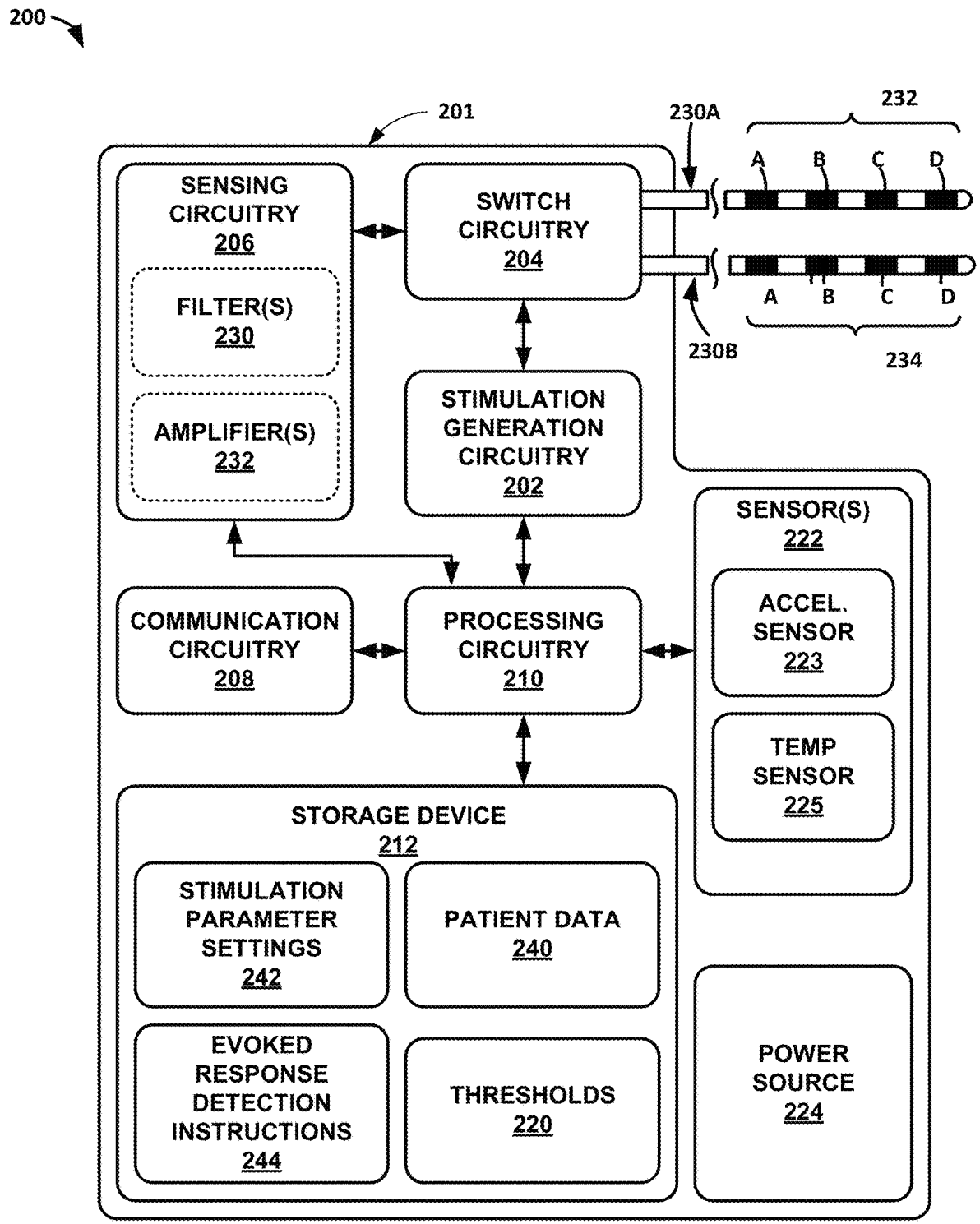
FIG. 2A is a block diagram illustrating an example combination of components of an IMD, in accordance with one or more techniques of this disclosure.

FIG. 2A is a block diagram illustrating an example combination of components of an IMD 200, in accordance with one or more techniques of this disclosure. IMD 200 may be an example of IMD 110 of FIG. 1. In the example shown in FIG. 2A, IMD 200 includes stimulation generation circuitry 202, switch circuitry 204, sensing circuitry 206, telemetry circuitry 208, processing circuitry 210, storage device 212, sensor(s) 222, and power source 224.

In the example shown in FIG. 2A, storage device 212 stores patient data 240, stimulation parameter settings 242, evoked response detection instructions 244 and various thresholds discussed in this disclosure in separate memories within storage device 212 or separate areas within storage device 212. Patient data 240 may include parameter values, target characteristic values, or other information specific to the patient. In some examples, stimulation parameter settings 242 may include stimulation parameter values for respective different stimulation programs selectable by the clinician or patient for therapy. In this manner, each stored therapy stimulation program, or set of stimulation parameter values, of stimulation parameter settings 242 defines values for a set of electrical stimulation parameters (e.g., a stimulation parameter set), such as a stimulation electrode combination, electrode polarity, current or voltage amplitude, pulse width, pulse rate, pulse shape, duty cycle, number of interleaved pulses, passive recharge settings, etc. Storage device 212 may also store evoked response detection instructions 244 that defines values for a set of electrical stimulation parameters configured to elicit a detectable evoked response signal, such as a stimulation electrode combination, electrode polarity, current or voltage amplitude, pulse width, pulse rate, and pulse shape. Evoked response detection instructions 244 may also have additional information such as instructions regarding when to deliver control pulses based on the pulse width and/or frequency of the pulses defined in stimulation parameter settings 242, detection windows for detecting evoked response signals, instructions for determining characteristic values from evoked response signals, etc. For example, evoked response detection instructions 244 may define how characteristic values of evoked response signals are to be determined.

Accordingly, in some examples, stimulation generation circuitry 202 generates electrical stimulation signals in accordance with the electrical stimulation parameters noted above. Other ranges of stimulation parameter values may also be useful and may depend on the target stimulation site within patient 105. Stimulation signals may be of any form, such as continuous-time signals (e.g., sine waves) or the like. Switch circuitry 204 may include one or more switch arrays, one or more multiplexers, one or more switches (e.g., a switch matrix or other collection of switches), or other electrical circuitry configured to direct stimulation signals from stimulation generation circuitry 202 to one or more of electrodes 232, 234, or directed sensed signals from one or more of electrodes 232, 234 to sensing circuitry 206. In other examples, stimulation generation circuitry 202 and/or sensing circuitry 206 may include sensing circuitry to direct signals to and/or from one or more of electrodes 232, 234, which may or may not also include switch circuitry 204.

Sensing circuitry 206 is configured to monitor signals from any combination of electrodes 232, 234. In some examples, sensing circuitry 206 includes one or more amplifiers, filters, and analog-to-digital converters. For example, amplifier(s) 232 of sensing circuitry 206 may amplify a sensed evoked response signal and/or filter(s) 230 of sensing circuitry 206 may filter a sensed evoked response signal which may be used to remove or reduce the impact of artifacts on a sensed evoked response signal. Sensing circuitry 206 may be used to sense physiological signals, such as evoked response signals. In some examples, sensing circuitry 206 detects evoked response from a particular combination of electrodes 232, 234. In some cases, the particular combination of electrodes for sensing evoked response includes different electrodes than a set of electrodes 232, 234 used to deliver stimulation pulses. Alternatively, in other cases, the particular combination of electrodes used for sensing evoked response includes at least one of the same electrodes as a set of electrodes used to deliver stimulation pulses to patient 105. Sensing circuitry 206 may provide signals to an analog-to-digital converter, for conversion into a digital signal for processing, analysis, storage, or output by processing circuitry 210.

Telemetry circuitry 208 supports wireless communication between IMD 200 and an external programmer (not shown in FIG. 2A) or another computing device under the control of processing circuitry 210. Processing circuitry 210 of IMD 200 may receive, as updates to programs, values for various stimulation parameters such as amplitude and electrode combination, from the external programmer via telemetry circuitry 208. Processing circuitry 210 may store updates to the stimulation parameter settings 242 or any other data in storage device 212. Telemetry circuitry 208 in IMD 200, as well as telemetry circuitry in other devices and systems described herein, such as the external programmer, may accomplish communication by radiofrequency (RF) communication techniques. In addition, telemetry circuitry 208 may communicate with an external medical device programmer (not shown in FIG. 2A) via proximal inductive interaction of IMD 200 with the external programmer. The external programmer may be one example of external programmer 150 of FIG. 1. Accordingly, telemetry circuitry 208 may send information to the external programmer on a continuous basis, at periodic intervals, or upon request from IMD 110 or the external programmer.

Processing circuitry 210 may include any one or more of a microprocessor, a controller, a digital signal processor (DSP), an application specific integrated circuit (ASIC), a field-programmable gate array (FPGA), discrete logic circuitry, or any other processing circuitry configured to provide the functions attributed to processing circuitry 210 herein may be embodied as firmware, hardware, software or any combination thereof. Processing circuitry 210 controls stimulation generation circuitry 202 to generate stimulation signals according to stimulation parameter settings 242 and any other instructions stored in storage device 212 to apply stimulation parameter values specified by one or more of programs, such as electrode combination, electrode polarity, amplitude, pulse width, pulse rate, pulse shape, number of interleaved pulses, passive recharge settings, etc., of each of the stimulation signals.

In the example shown in FIG. 2A, lead 230A is shown having a set of electrodes 232 that includes electrodes 232A-232D, and lead 230B is shown having a set of electrodes 234 includes electrodes 234A-234D. However, lead 230A and lead 230 B may have any number of electrodes, such as 8 electrodes or 16 electrodes. In other examples, a single lead may be coupled to IMD 200 which may include any number of electrodes, such as include 8 electrodes or 16 electrodes along a single axial length of the lead. In some examples, one or more leads may include electrodes as shown in FIGS. 3A-3E.

Processing circuitry 210 also controls stimulation generation circuitry 202 to generate and apply the stimulation signals to selected combinations of electrodes 232, 234. In some examples, stimulation generation circuitry 202 includes a switch circuit (instead of, or in addition to, switch circuitry 204) that may couple stimulation signals to selected conductors within leads 230, which, in turn, deliver the stimulation signals across selected electrodes 232, 234. Such a switch circuit may be a switch array, switch matrix, multiplexer, or any other type of switching circuit configured to selectively couple stimulation energy to selected electrodes 232, 234 and to selectively sense bioelectrical neural signals of a spinal cord of the patient (not shown in FIG. 2A) with selected electrodes 232, 234.

In other examples, however, stimulation generation circuitry 202 does not include a switch circuit and switch circuitry 204 does not interface between stimulation generation circuitry 202 and electrodes 232, 234. In these examples, stimulation generation circuitry 202 includes a plurality of pairs of voltage sources, current sources, voltage sinks, or current sinks connected to each of electrodes 232, 234 such that each pair of electrodes has a unique signal circuit. In other words, in these examples, each of electrodes 232, 234 is independently controlled via its own signal circuit (e.g., via a combination of a regulated voltage source and sink or regulated current source and sink), as opposed to switching signals between electrodes 232, 234.

Electrodes 232, 234 on respective leads 230 may be constructed of a variety of different designs. For example, one or both of leads 230 may include one or more electrodes at each longitudinal location along the length of the lead, such as one electrode at different perimeter locations around the perimeter of the lead at each of the locations A, B, C, and D. In one example, the electrodes may be electrically coupled to stimulation generation circuitry 202, e.g., via switch circuitry 204 and/or switching circuitry of the stimulation generation circuitry 202, via respective wires that are straight or coiled within the housing of the lead and run to a connector at the proximal end of the lead. In another example, each of the electrodes of the lead may be electrodes deposited on a thin film. The thin film may include an electrically conductive trace for each electrode that runs the length of the thin film to a proximal end connector. The thin film may then be wrapped (e.g., a helical wrap) around an internal member to form the lead 230. These and other constructions may be used to create a lead with a complex electrode geometry.

Although sensing circuitry 206 is incorporated into a common housing with stimulation generation circuitry 202 and processing circuitry 210 in FIG. 2A, in other examples, sensing circuitry 206 may be in a separate housing from IMD 200 and may communicate with processing circuitry 210 via wired or wireless communication techniques. In some examples, one or more of electrodes 232 and 234 are suitable for sensing the evoked responses. For instance, electrodes 232 and 234 may sense the voltage amplitude of a portion of the evoked response signals, where the sensed voltage amplitude, such as the voltage difference between features within the signal, is a characteristic the evoked response signal.

Processing circuitry 210 may adapt stimulation parameters when an artifact in the sensed evoked response signal shifts in a sensing window. Processing circuitry 210 may determine that at least one of the artifact or the sensed evoked response signal is more and a difference threshold different than an expected evoked response signal and refrain from changing the stimulation parameters based on the sensed evoked response signal (e.g., temporarily stopping the use of closed-loop stimulation, in which case stimulation generation circuitry 202 may continue to deliver stimulation using the existing stimulation parameters). For example, processing circuitry 210 may compare the amplitude of the artifact and/or the sensed evoked response signal to the amplitude of the expected evoked response signal to determine whether the sensed evoked response signal is more than the difference threshold different from the expected evoked response signal and avoid changing stimulation parameters because the artifact may be overpowering the biological response in the sensed evoked response signal.

Processing circuitry 210 may determine a window, having a time duration, for amplification of the sensed evoked response signal for amplifier(s) 232. Processing circuitry 210 may weight temporal data within the window. In some examples, the weighting may be different for different portions of the window. By weighting an area of the window having the artifact with a lower weight than the other areas of the window, processing circuitry 210 may reduce or remove the artifact from the sensed evoked response signal. Processing circuitry 210 may adjust averaging of the weighted temporal data based on noise within the sensed evoked response signal.

In some examples, processing circuitry 210 may change stimulation parameters in an attempt to improve the quality of the sensed evoked response signal. For example, processing circuitry 210 may, in response to determining that the characteristic value of at least one of the artifact or the sensed evoked response signal is greater than the amplitude threshold, alternate the polarity of the stimulation electrodes and average the sensed evoked response signal over time. For example, processing circuitry 210 may change the polarity of the stimulation electrodes from one polarity to the opposite polarity, back and forth, and average the resulting sensed evoked response signal. For example, if the stimulation electrodes are electrodes 232D and 234D and electrode 232D functions as an anode and electrode 234D functions as a cathode, processing circuitry 210 may change electrode 232D to function as the cathode and electrode 234D to function as the anode. Processing circuitry 210 may control stimulation generation circuitry 202 to deliver a probe pulse and a mask the neural response (thereby unmasking the artifact). Processing circuitry 210 may then subtract the captured artifact waveform from subsequent sensed evoked response signals without the masked pulse to identify the evoked response in the sensed evoked response signal. In some examples, the masker pulse may be the opposite polarity or differ in amplitude from the probe pulse.

In some examples, processing circuitry 201 may determine that the amplitude of the artifact has grown and, in response to that determination, change a number of interleaved pulses of the stimulation parameters. For example, if the number of interleaved pulses was previously 10, processing circuitry 210 may increase or decrease that number in an attempt to improve the signal quality of the sensed evoked response signal. In some examples, processing circuitry 210 may change at least one passive recharge setting of the stimulation parameters based on a time constant of the artifact. In some examples, processing circuitry 210 may change a pulse shape of the stimulation parameters in an attempt to improve the quality of the sensed evoked response signal.

Storage device 212 may be configured to store information within IMD 200 during operation. Storage device 212 may include a computer-readable storage medium or computer-readable storage device. In some examples, storage device 212 includes one or more of a short-term memory or a long-term memory. Storage device 212 may include, for example, random access memories (RAM), ferroelectric random access memories (FRAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage device 212 is used to store data indicative of instructions for execution by processing circuitry 210. As discussed above, storage device 212 is configured to store patient data 240, stimulation parameter 214, and evoked response detection instructions 244.

In some examples, storage device 212 may store evoked response detection instructions 244 which may include instructions on how processing circuitry 210 can adjust stimulation (e.g., stimulation parameter settings 242), the manner in which evoked responses are sensed (e.g., evoked response detection instructions 244), and/or the manner in which characteristic values are determined (e.g., evoked response detection instructions 244), in response to the determined characteristic values of evoked response signals or artifacts. For example, processing circuitry 210 may monitor evoked response characteristic values obtained from evoked response signals (or a signal derived from the evoked response signal) to modulate stimulation parameter values (e.g., electrode combination, or increase or decrease stimulation intensity to maintain a target therapeutic effect), the manner in which evoked potential signals are sensed, and/or the manner in which characteristic values are determined. In some examples, a target evoked response characteristic value may vary for different situations for a patient, such as different posture states, times of day, activities, etc.

Sensor(s) 222 may include one or more sensing elements that sense values of a respective patient parameter, such as posture state. As described, electrodes 232 and 234 may be the electrodes that sense the characteristic value of the evoked response signal. Sensor(s) 222 may include one or more accelerometers, optical sensors, chemical sensors, temperature sensors, pressure sensors, or any other types of sensors. Sensor(s) 222 may output patient parameter values that may be used as feedback to control delivery of therapy. For example, sensor(s) 222 may indicate patient activity, and processing circuitry 210 may increase the frequency of control pulses and evoked response sensing in response to detecting increased patient activity. In one example, processing circuitry 210 may initiate control pulses and corresponding evoked response sensing in response to a signal from sensor(s) 222 indicating that patient activity has exceeded an activity threshold. Conversely, processing circuitry 210 may decrease the frequency of control pulses and evoked response sensing in response to detecting decreased patient activity. For example, in response to sensor(s) 222 no longer indicating that the sensed patient activity exceeds a threshold, processing circuitry 210 may suspend or stop delivery of control pulses and evoked response sensing. In this manner, processing circuitry 210 may dynamically deliver control pulses and sense evoked response signals based on patient activity to reduce power consumption of the system when the electrode-to-neuron distance is not likely to change and increase system response to evoked response changes when electrode-to-neuron distance is likely to change. IMD 200 may include additional sensors within the housing of IMD 200 and/or coupled via one of leads 230 or other leads. In addition, IMD 200 may receive sensor signals wirelessly from remote sensors via telemetry circuitry 208, for example. In some examples, one or more of these remote sensors may be external to patient (e.g., carried on the external surface of the skin, attached to clothing, or otherwise positioned external to patient 105). In some examples, signals from sensor(s) 222 indicate a position, body state, or posture (e.g., sleeping, awake, sitting, standing, or the like), and processing circuitry 210 may select target evoked response characteristic values according to the indicated position or body state.

Power source 224 is configured to deliver operating power to the components of IMD 200. Power source 224 may include a battery and a power generation circuit to produce the operating power. In some examples, the battery is rechargeable to allow extended operation. In some examples, recharging is accomplished through proximal inductive interaction between an external charger and an inductive charging coil within IMD 200. Power source 224 may include any one or more of a plurality of different battery types, such as nickel cadmium batteries and lithium ion batteries.

Figure 2B:
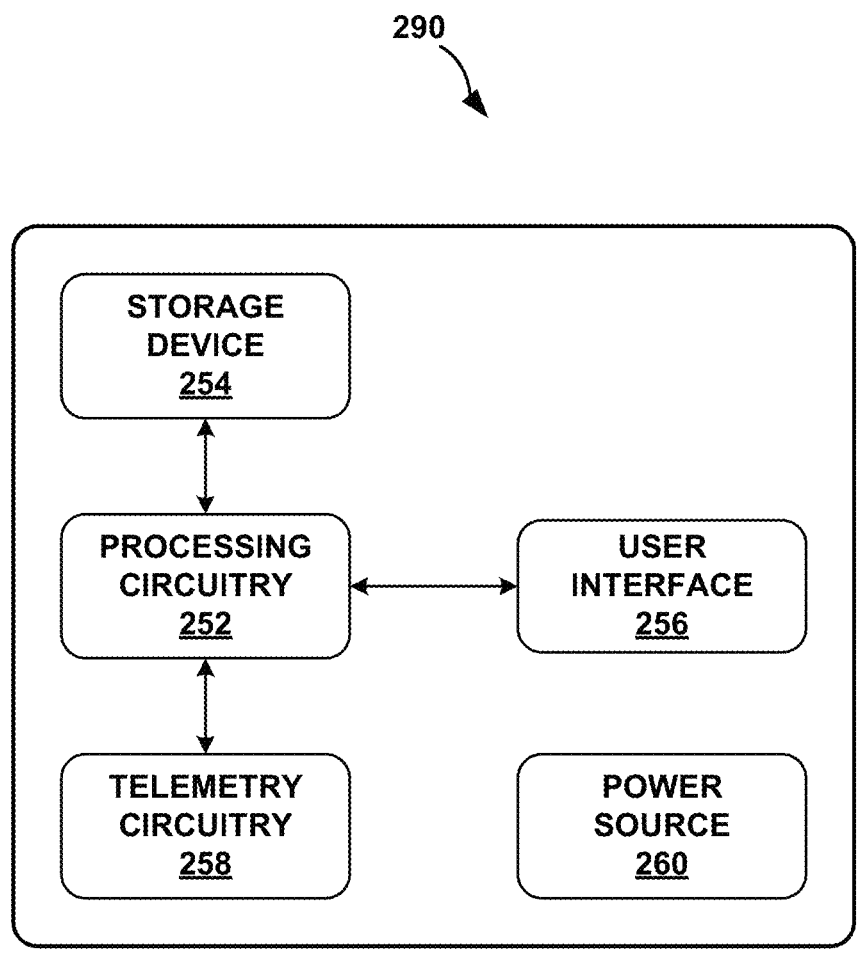
FIG. 2B is a block diagram illustrating an example combination of components of an example external programmer, in accordance with one or more techniques of this disclosure.

FIG. 2B is a block diagram illustrating an example combination of components of an example external programmer 290. External programmer 290 may be an example of external programmer 150 of FIG. 1. Although external programmer 290 may generally be described as a hand-held device, external programmer 290 may be a larger portable device or a more stationary device. In addition, in other examples, external programmer 290 may be included as part of an external charging device or include the functionality of an external charging device. As illustrated in FIG. 2B, external programmer 290 may include processing circuitry 252, storage device 254, user interface 256, telemetry circuitry 258, and power source 260. Storage device 254 may store instructions that, when executed by processing circuitry 252, cause processing circuitry 252 and external programmer 290 to provide the functionality ascribed to external programmer 290 throughout this disclosure. Each of these components, circuitry, or modules, may include electrical circuitry that is configured to perform some, or all of the functionality described herein. For example, processing circuitry 252 may include processing circuitry configured to perform the processes discussed with respect to processing circuitry 252.

In general, external programmer 290 includes any suitable arrangement of hardware, alone or in combination with software and/or firmware, to perform the techniques attributed to external programmer 290, and processing circuitry 352, user interface 356, and telemetry circuitry 358 of external programmer 290. In various examples, external programmer 290 may include one or more processors, such as one or more microprocessors, DSPs, ASICs, FPGAs, or any other equivalent integrated or discrete logic circuitry, as well as any combinations of such components. External programmer 290 also, in various examples, may include a storage device 254, such as RAM, ROM, PROM, EPROM, EEPROM, flash memory, a hard disk, a CD-ROM, including executable instructions for causing the one or more processors to perform the actions attributed to them. Moreover, although processing circuitry 252 and telemetry circuitry 258 are described as separate modules, in some examples, processing circuitry 252 and telemetry circuitry 258 are functionally integrated. In some examples, processing circuitry 252 and telemetry circuitry 258 correspond to individual hardware units, such as ASICs, DSPs, FPGAs, or other hardware units.

Storage device 254 (e.g., a storage device) may store instructions that, when executed by processing circuitry 252, cause processing circuitry 252 and external programmer 290 to provide the functionality ascribed to external programmer 290 throughout this disclosure. For example, storage device 254 may include instructions that cause processing circuitry 252 to obtain a parameter set from memory, select a spatial electrode pattern, or receive a user input and send a corresponding command to IMD 200, or instructions for any other functionality. In addition, storage device 254 may include a plurality of programs, where each program includes a stimulation parameter set that defines therapy stimulation or control stimulation. Storage device 254 may also store data received from a medical device (e.g., IMD 110). For example, storage device 254 may store evoked response related data sensed by sensing circuitry of the medical device, and storage device 254 may also store data from one or more sensors of the medical device.

User interface 256 may include a button or keypad, lights, a speaker for voice commands, a display, such as a liquid crystal (LCD), light-emitting diode (LED), or organic light-emitting diode (OLED). In some examples the display includes a touch screen. User interface 256 may be configured to display any information related to the delivery of electrical stimulation, identified posture states, sensed patient parameter values, or any other such information. User interface 256 may also receive user input (e.g., indication of when the patient perceives a stimulation pulse) via user interface 256. The input may be, for example, in the form of pressing a button on a keypad or selecting an icon from a touch screen. The input may request starting or stopping electrical stimulation, the input may request different stimulation parameters (e.g., to change a stimulation program), or the input may request some other change to the delivery of electrical stimulation or sensing.

Telemetry circuitry 258 may support wireless communication between the medical device and external programmer 290 under the control of processing circuitry 252. Telemetry circuitry 258 may also be configured to communicate with another computing device via wireless communication techniques, or direct communication through a wired connection. In some examples, telemetry circuitry 258 provides wireless communication via an RF or proximal inductive medium. In some examples, telemetry circuitry 258 includes an antenna, which may take on a variety of forms, such as an internal or external antenna.

Examples of local wireless communication techniques that may be employed to facilitate communication between external programmer 290 and IMD 110 include RF communication according to the 802.11 or Bluetooth® specification sets or other standard or proprietary telemetry protocols. In this manner, other external devices may be capable of communicating with external programmer 290 without needing to establish a secure wireless connection. As described herein, telemetry circuitry 258 may be configured to transmit a spatial electrode movement pattern or other stimulation parameter values to IMD 110 for delivery of electrical stimulation therapy. Although IMD 110 may determine characteristic values for evoked response signals and control the adjustment of stimulation parameter values or sensing parameters, in some examples, programmer 290 may perform these tasks alone or together with IMD 110 in a distributed function.

In some examples, selection of stimulation parameters or therapy stimulation programs and/or sensing parameters are transmitted to the medical device for delivery of stimulation to a patient (e.g., patient 105 of FIG. 1) and sensing of evoked response signals. In other examples, the therapy may include medication, activities, or other instructions that patient 105 must perform themselves or a caregiver perform for patient 105. In some examples, external programmer 290 provides visual, audible, and/or tactile notifications that indicate there are new instructions. External programmer 290 requires receiving user input acknowledging that the instructions have been completed in some examples.

User interface 256 of external programmer 290 may also be configured to receive an indication from a clinician instructing a processor of the medical device to update one or more therapy stimulation programs or to update the target characteristic values for evoked response signals. Updating therapy stimulation programs and target characteristic values may include changing one or more parameters of the stimulation pulses delivered by the medical device according to the programs, such as amplitude, pulse width, frequency, pulse shape of the pulses and/or control pulses, electrode combinations, electrode polarity, number of interleaved pulses, passive recharge settings, etc. User interface 256 may also receive instructions from the clinician commanding any electrical stimulation, including therapy stimulation and control stimulation to commence or to cease.

Power source 260 is configured to deliver operating power to the components of external programmer 290. Power source 260 may include a battery and a power generation circuit to produce the operating power. In some examples, the battery is rechargeable to allow extended operation. Recharging may be accomplished by electrically coupling power source 260 to a cradle or plug that is connected to an alternating current (AC) outlet. In addition, recharging may be accomplished through proximal inductive interaction between an external charger and an inductive charging coil within external programmer 290. In other examples, traditional batteries (e.g., nickel cadmium or lithium ion batteries) may be used. In addition, external programmer 290 may be directly coupled to an alternating current outlet to operate.

The architecture of external programmer 290 illustrated in FIG. 2B is shown as an example. The techniques as set forth in this disclosure may be implemented in the example external programmer 290 of FIG. 2B, as well as other types of systems not described specifically herein. Nothing in this disclosure should be construed so as to limit the techniques of this disclosure to the example architecture illustrated by FIG. 2B.

Figure 3A:
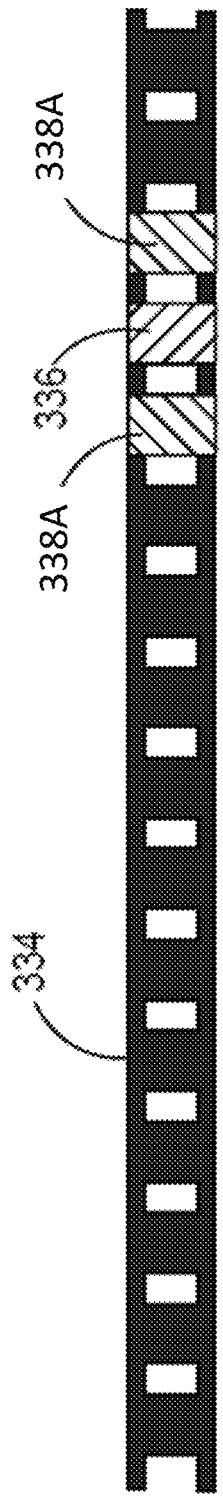
FIGS. 3A-3E are conceptual diagram illustrating example sensing electrodes, in accordance with one or more techniques of this disclosure.

The techniques herein include changing sensing parameters such as which electrodes are used to sense an evoked response in an attempt to improve signal quality in a sensed evoked response signal due to artifacts or noise. In the example of FIG. 3A, each black square on lead 334 may represent an electrode carried by lead 334. Electrode 336 may be a stimulation electrode and an electrode closest to target tissue. Electrodes 338A may represent sensing electrodes. While in this example, electrode 336 may be a stimulation electrode and electrodes 338A may be sensing electrodes, this disclosure is not so limited and stimulation electrodes and/or sensing electrodes may be located at any position along lead 334. As the sensing electrodes in FIG. 3A are very close to a stimulation electrode, electrode 336, they may likely sense an artifact. When IMD 110 determines that a characteristic value of at least one of the artifact or the sensed evoked response signal meets a threshold, in some examples, IMD 110 may change a proximity of at least one of sensing electrodes 338A to the anatomy (e.g., target tissue) or change the spacing between the sensing electrodes or the spacing between the sensing electrodes and the stimulation electrodes.

Figure 3B:
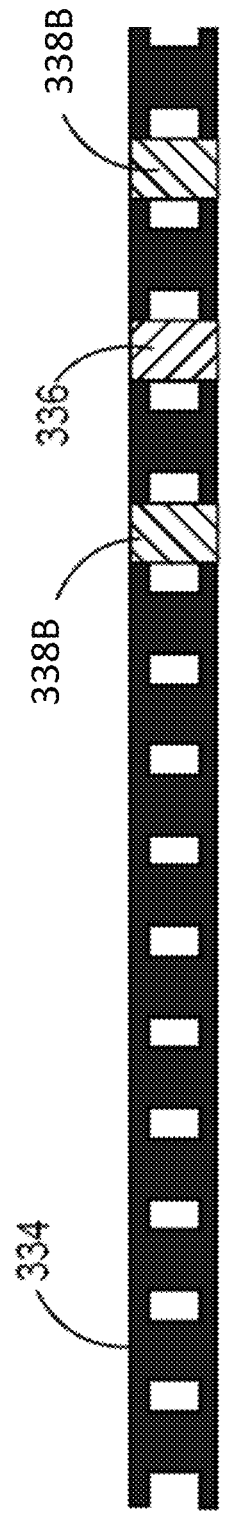
Figure 3C:
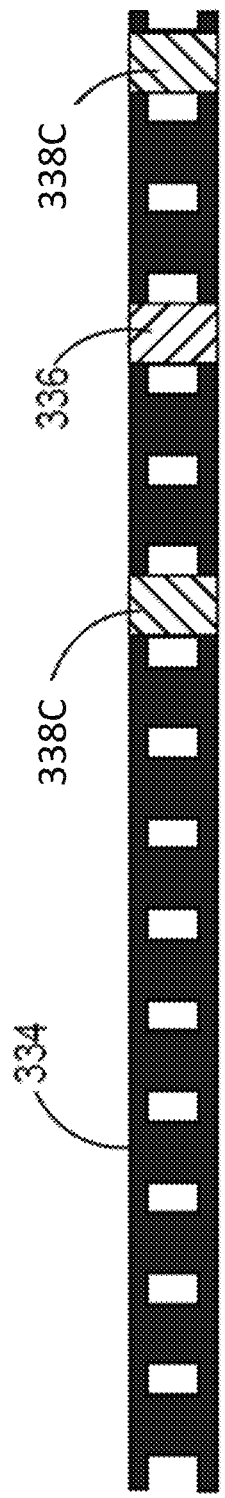

For example, IMD 110 may change the sensing electrodes to sensing electrodes 338B, which may be located farther from the anatomy and/or be farther apart from each other as shown in FIG. 3B. In some examples, IMD 110 may iteratively back such sensing electrodes away from the anatomy or to be spaced differently, for example, moving from the configuration of FIG. 3A, to that of FIG. 3B, to that of FIG. 3C, with the sensing electrodes being electrodes 338C. In some examples, IMD 110 may continue to do so until the signal quality of the sensed evoked response signal no longer meets the threshold.

Figure 3D:
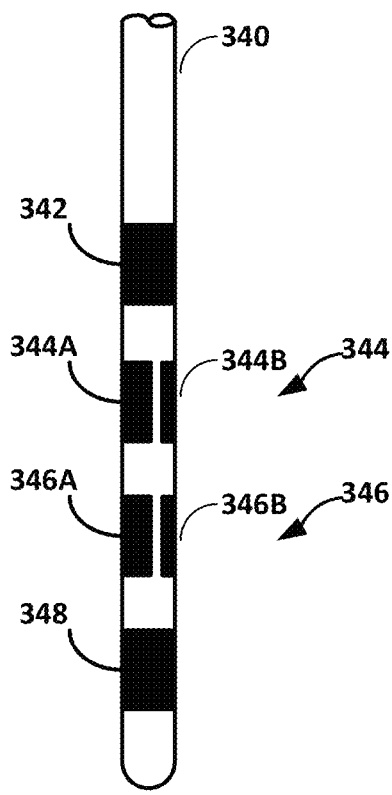
Figure 4A:
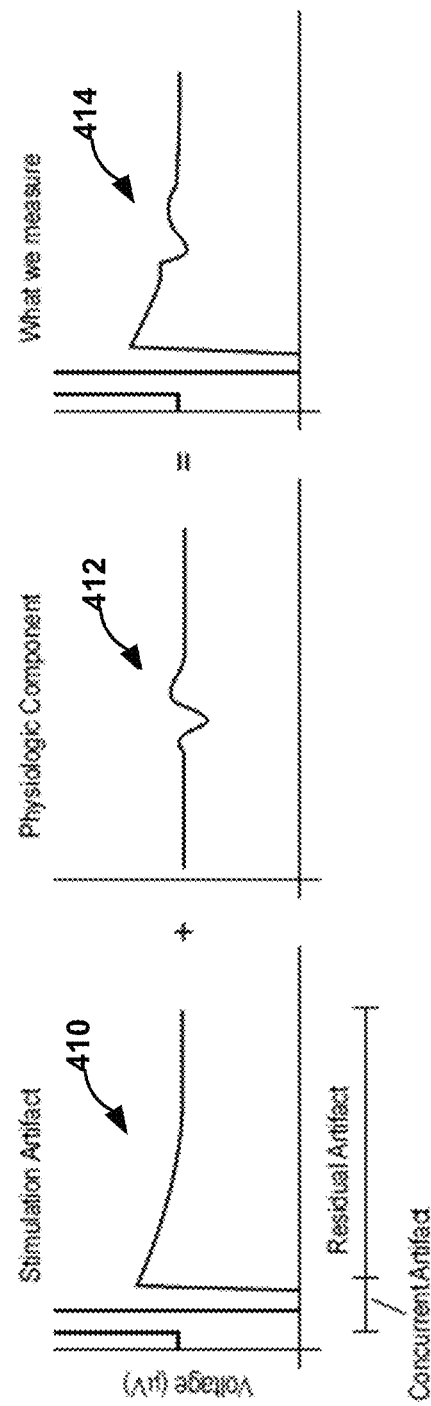
FIG. 4A is a graph of example sensed evoked compound action potentials (ECAPs), in accordance with one or more techniques of this disclosure.

FIG. 3D is a conceptual diagram of a lead having segmented electrodes. As shown in FIG. 3D, lead 340 includes four axial electrode levels, electrode level 342, electrode level 344 (which may include segments 344A, 344B, and 344C (not shown because it may be on the far side of lead 340)), electrode level 346 (which may include segments 344B, and 344C (not shown because it may be on the far side of lead 340)) positioned at various lengths along a body of lead 340. In some examples, electrode levels 342, 344, 346C, and 348 may be equally spaced along the axial length of lead 340 at different axial positions. Each electrode level 404A-404D may have one, two, three, or more electrodes located at different angular positions around the circumference (e.g., around the perimeter) of lead 340. As shown in FIG. 4A, electrode level 342 and 348 include a single respective ring electrode, and electrode levels 344 and 346 each include three segmented electrodes at different circumferential positions. This electrode pattern may be referred to as a 1-3-3-1 lead in reference to the number of electrodes from the proximal end to the distal end of lead 340. Electrodes of one circumferential location may be lined up on an axis parallel to the longitudinal axis of lead 340. Alternatively, electrodes of different electrode levels may be staggered around the circumference of lead 340. In addition, lead 340 may include asymmetrical electrode locations around the circumference, or perimeter, of each lead or electrodes of the same level that have different sizes. These electrodes may include semi-circular electrodes that may or may not be circumferentially aligned between electrode levels.

Figure 3E:
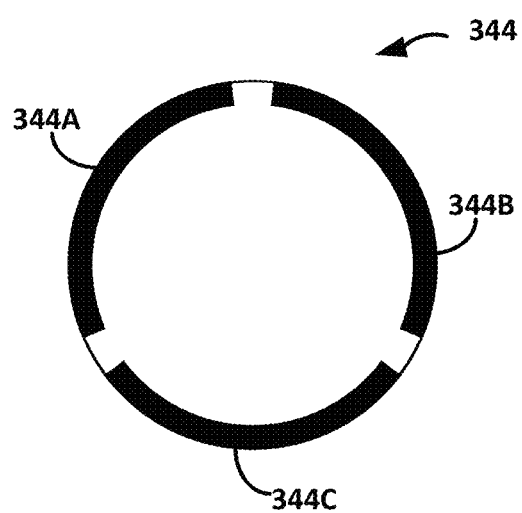

FIG. 3E is a conceptual cross-sectional diagram of electrode level 344 of FIG. 3D. As discussed herein, when IMD 110 determines that a characteristic value of at least one of the artifact or the sensed evoked signal meets a threshold, IMD 110 may change an orientation of at least one sensing electrode. The orientation may refer to the direction that a sensing electrode may be facing or a combination of electrodes may be facing (e.g., the electrode combination used for sensing). Changing an orientation of a sensing electrode may include selecting a different sensing electrode or combination of electrodes rather than physically moving a sensing electrode. For example, IMD 110 may change a sensing electrode from electrode 344A to electrode 344B or to a combination of electrodes such as from electrode 344A to electrodes 344A and 344B or to electrodes 344B and 344C to change an orientation of a sensing electrode. In this manner, IMD 110 may change an orientation of at least one sensing electrode.

FIG. 4A is a graph of example sensed evoked compound action potentials (ECAPs), in accordance with one or more techniques of this disclosure. Evoked biopotentials recorded in a body of a patient, such as evoked compound action potential (ECAP) generally consists of two elements: stimulation artifact 410 and an actual electrophysiologic component 412, as shown in FIG. 4A. For ECAPs measured in the spinal cord, characteristics of the ECAP (such as the amplitude, timing, and morphology) may be set by many factors such as, but not limited to, separation between the stimulating and sensing electrodes, spacing between the sensing electrodes, dimensions and composition of the electrodes, stimulation parameter set (electrode selection, frequency, amplitude, pulse width, pulse shape, etc.), location of the electrodes with respect to anatomical structures such as the laminar bone, midline vs. lateral placement, and the dorsal roots, thickness of the cerebrospinal fluid, and neurophysiologic state of the patient. The resulting sensed signaling may resemble sensed signal 414. In general, it may be preferred to maximize the electrophysiologic component of the ECAP while minimizing the stimulation artifact. In some examples, the system or clinician may prioritize greater electrophysiologic component signal amplitude or prioritize reduced amplitude of the stimulation artifact.

Figure 4B:
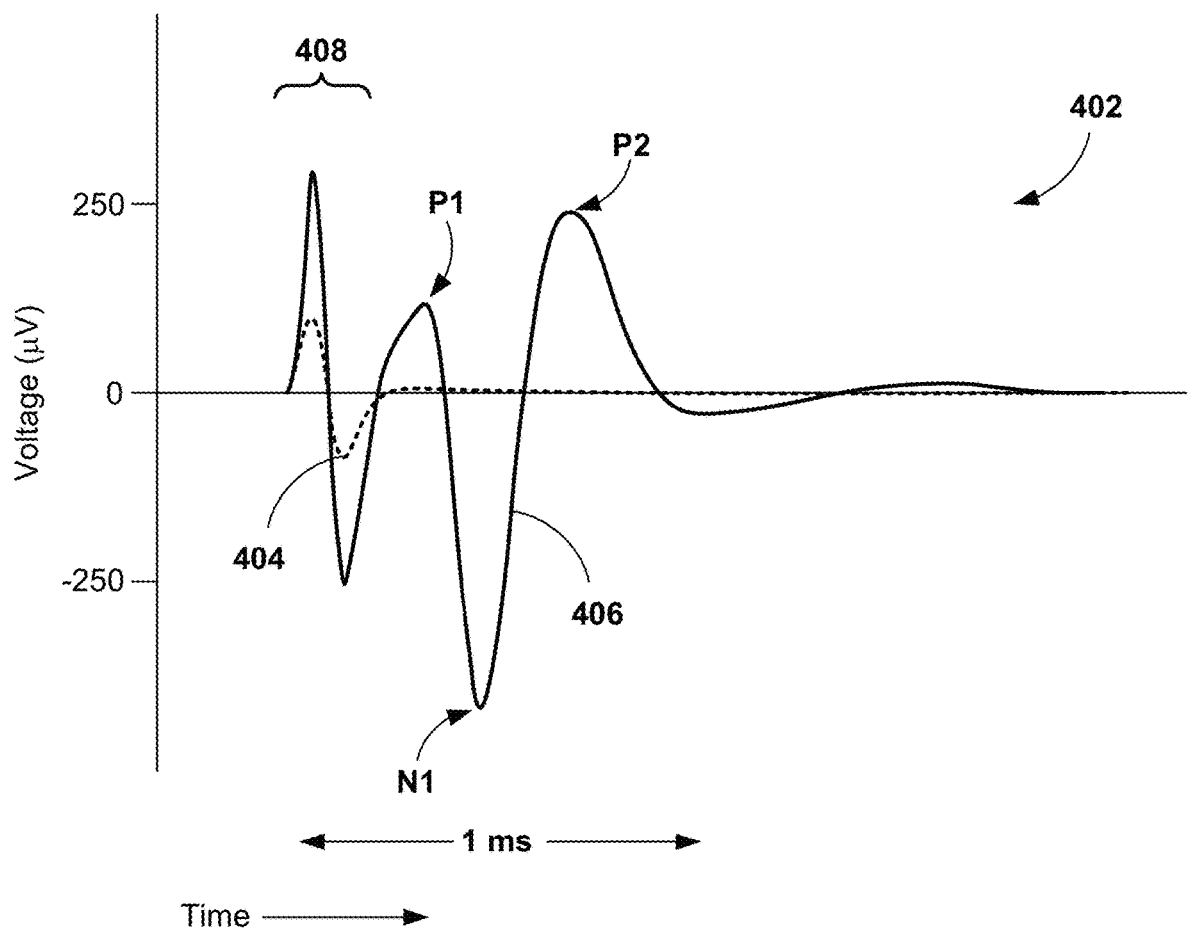
FIG. 4B is a graph of example ECAPs sensed for respective stimulation pulses, in accordance with one or more techniques of this disclosure.

FIG. 4B is a graph 402 of example ECAPs sensed for respective stimulation pulses, in accordance with one or more techniques of this disclosure. As shown in FIG. 4B, graph 402 shows example ECAP signal 404 (dotted line) and ECAP signal 406 (solid line). In some examples, each of ECAP signals 404 and 406 are sensed from stimulation pulses that were delivered from a guarded cathode, where the control pulses are bi-phasic pulses including an interphase interval between each positive and negative phase of the pulse. In some such examples, the guarded cathode includes stimulation electrodes located at the end of an 8-electrode lead while two sensing electrodes are provided at the other end of the 8-electrode lead. ECAP signal 404 illustrates the voltage amplitude sensed as a result from a sub-detection threshold stimulation pulse. In other words, the stimulation pulse did not elicit a detectable ECAP signal in ECAP signal 404. Peaks 408 of ECAP signal 404 are detected and represent the artifact of the delivered stimulation pulse. However, no propagating signal is detected after the artifact in ECAP signal 404 because the stimulation pulse was sub-detection threshold (e.g., the intensity of the stimulation pulse was insufficient to cause nerve fibers to depolarize and generate a detectable ECAP signal).

In contrast to ECAP signal 404, ECAP signal 406 represents the voltage amplitude detected from a supra-detection threshold stimulation pulse. Peaks 408 of ECAP signal 406 are detected and represent the artifact of the delivered stimulation pulse. After peaks 408, ECAP signal 406 also includes electrophysiological components such as peaks P1, N1, and P2, which are three typical peaks representative of propagating action potentials from an ECAP. In some examples, the techniques described herein include selection of an electrode combination which maximizes the electrophysiological components of the ECAP signal. The example duration of the artifact and peaks P1, N1, and P2 is approximately 1 millisecond (ms). The time between two points in the ECAP signal may be referred to as a latency of the ECAP and may indicate the types of fibers being captured by the control pulse. ECAP signals with lower latency (i.e., smaller latency values) indicate a higher percentage of nerve fibers that have faster propagation of signals, whereas ECAP signals with higher latency (i.e., larger latency values) indicate a higher percentage of nerve fibers that have slower propagation of signals. Other characteristics of the ECAP signal may be used in other examples.

The amplitude of the ECAP signal (e.g., peaks within the ECAP signal) generally increases with increased amplitude of the stimulation pulse, as long as the pulse amplitude is greater than threshold such that nerves depolarize and propagate the signal. The target ECAP characteristic (e.g., the target ECAP amplitude) may be determined from an ECAP signal associated with an estimated neural response detected from pulses delivering therapy to patient 105. The ECAP signal thus is representative of the distance between the stimulation electrodes and the nerves appropriate for the stimulation parameter values of the pulses delivered at that time. In some examples, the target ECAP characteristic may include one in which a stimulation artifact is minimized and/or a neural activation is maximized.

In some examples, processing circuitry 210 or other devices may be configured to determine a characteristic value for an ECAP signal, for example, from multiple different features of one or more signals associated with the ECAP signal. The characteristic value of the ECAP signal may be determined by removing an artifact from the ECAP signal using the processing circuitry. These different features may be incorporated into an average, weighted average, or other combination that represents the relative action potentials of the ECAP signal. Processing circuitry 210 may determine the characteristic value from different features of the same signal, such as the amplitude difference between two peaks in the ECAP signal and the amplitude difference between two difference peaks in the ECAP signal. As another example of features from the same signal, processing circuitry 210 may determine the characteristic value based on an average of two different peaks in the second derivative signal. Alternatively, processing circuitry 210 may determine the characteristic value of the ECAP signal from features obtained from different signals. For example, processing circuitry 210 may determine the difference between the minimum and maximum values of the first derivative of the ECAP signal on either side of the P2 peak, determine the maximum value of the second derivative of the ECAP signal, and combine each of these factors into a single characteristic value of the ECAP signal. This single characteristic value of the ECAP signal may be referred to as a composite characteristic value because it is a composite of several different factors derived from the ECAP signal in order to obtain a more complete representation of the ECAP signal.

In one or more examples, the ECAP characteristic values may be determined after subtracting the artifact, to the extent an artifact may be present during some portion of the sensed ECAP signal. In some examples, that artifact may be modeled as a sum of exponential and a linear component. In another example, the artifact may be modeled sufficiently by either an exponential or a linear component alone. In order to fit the artifact to the response for the growth curve, several methods may be used. In one or more examples, the method may include estimating a minimum in the error function between the artifact model and the measured response. For example, if parameters of the function are P (e.g., time constant of the exponential, gain and linear slope and offset), the error function may be:

$$\mathrm{Err}(P) = E[E(t) - A(P,t)]$$

The optimal fit is to find P opt where the error Err(P) is minimized. The ECAP characteristic value may be determined the recording E(t) as:

$$\mathrm{ECAP}(t) = E(t) - A(P_{opt}, t)$$

A common error function Err is something like a norm-2, which is defined as $$E = \mathrm{sqrt}(\mathrm{sum\_}t((E(t) - A(P,t))^2)$$

An example model A(P,t) with four parameters is as follows:

$$A(P,t) = \exp(-t/P(1))*P(2) + t*P(3) + P(4)$$

In one or more examples, the error function may be modified by a weight function W(t), where W(t) is high for instances where the neural response is low, for example in the first region. For example, the W function may be high for t early in the measured waveform E(t) (for example prior to neural response developing) and low where the neural response can be high. In some examples, W(t) can be higher after the response.

$$E[P]=\text{sqrt}(\text{sum}\_t(W(t)*(E(t)-A(P,t))^2)$$

In this way, the model can be fit more specifically to the artifact, and not to the neural response, for example for the first region. The weight can thus be adjusted by the system to reduce the effect of any stimulation artifact while maintaining ECAP components to the signal. Note that for this analysis a uniform W (e.g., the weight) may be used so this feature may be optional.

It is also understood that once the time constant P(1) is estimated, the rest of parameters may be solved. For instance, in some examples, if M is defined as a matrix with rows [exp(−t/P(1)) t 1] and Wm is a matrix with diagonal equal to W, then parameter P(2) to P(4) may be:

$$P_{end}=(A'*\text{diag}(W)*\text{diag}(W)*A)\backslash(A'*\text{diag}(W)*\text{diag}(W)\\*\text{data})$$

Figure 4C:
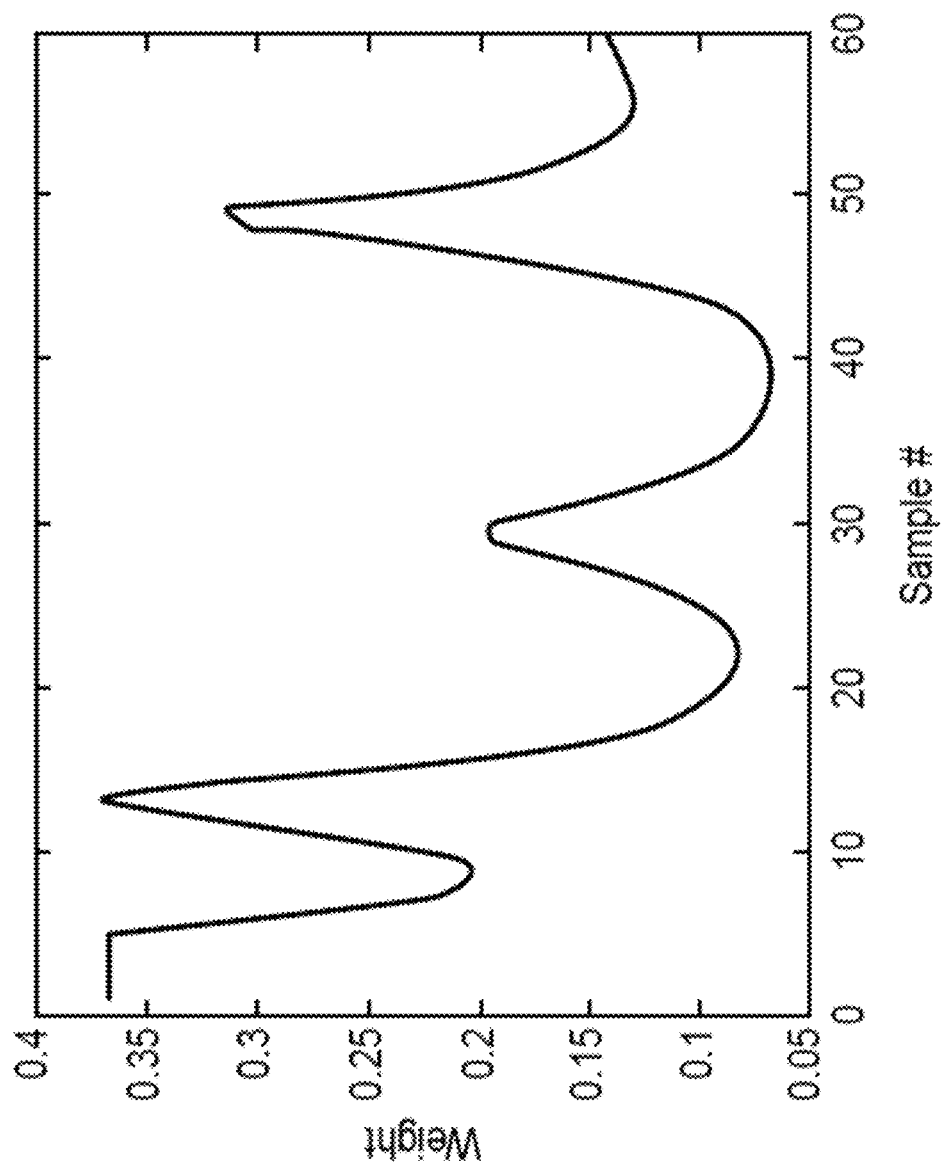
FIG. 4C is a graph of an example weight array W for multiple samples, in accordance with one or more techniques of this disclosure.

In the above table, the "\" operator is a matrix inversion operator and diag(W) transforms the weight vector of length n to a matrix of weight n with contents of W. An example weight array W is shown in FIG. 4C. Features of interest in W may include high starting level (where most of the artifact is contained but ECAP response is low), and low weight for features which may contain the main ECAP energy (e.g., around sample 20 and 40). In addition, weight might contain peaks corresponding to typical transition regions (e.g., peak around sample 11 or sample 30).

For real-time systems, the matrix multiplication operation may be fairly efficient. Thus, there may be an adaptive procedure to solve for P(1) (for example by back-propagation of error method) and then an analytic method to solve for P(2) to P(4). In one or more examples, if the artifact can change fairly rapidly, speed of back-propagation kind of algorithm may be adjusted depending on the error term (e.g., large errors can lead to faster adaptation of P(1)). In some examples, either P(1) or range of P(1) can be estimated using equipment external to the implant, such as a clinician programmer or a patient programmer.

For certain weight functions, the equation for $P_{end}$ can be a sparse equation and can be reduced to a non-FIR filter model. In addition, several P(1) candidates may be evaluated and the smallest one can be selected for the algorithm. Another alternative may be to determine evaluate several P(1) candidates, pick the minimum one, but to utilize the adjacent near-by measurements to fit a curve, e.g., a parabola, to determine more precisely the location of the minimum. In this way, only accuracy can be improved with fewer evaluations.

In one or more examples, the artifact may be removed from the ECAP using various methods, including, but not limited to, a standard method, artifact model method, high-pass filter method, or a correlation method, where each method uses the processing circuitry to determine the ECAP characteristic value such as neural activation.

In using the standard method (SM) to determine ECAP characteristic value, waveforms $V_i(t)$ may be low-pass filtered (Kaiser filter, 11 tap, 4.5 kHz) to further band-limit and reduce asynchronous noise. In one or more examples, ECAP amplitude may be subsequently (calculated) estimated as a difference (e.g., in amplitude, such as in µV) between the P2 and N1 features of the ECAP. In one or more examples, N1 may be defined as the minimum amplitude of the filtered waveform in the temporal window from 0.3 to 0.6 milliseconds (ms), while P2 may be defined as the maximum amplitude in the temporal window from 0.7 to 1.1 ms. These windows of time may be set given the anticipated latencies and morphological characteristics of the ECAP. The latencies may be a function of the spacing between the stimulating and recording electrodes, along with the expected conduction velocity of ECAPs in the spinal cord. In cases of large artifact that starts positive and decays over time, it is possible that the N1 is greater than P2, where the N1-P2 may be computed to be negative.

The processing circuitry 210 may also, or alternatively, use an artifact model (AM) to determine a ECAP characteristic value. In one or more examples, the stimulation artifact may be composed of two decaying exponentials with different time constants. In one or more examples, over a relatively short post-stimulation window for estimating spinal ECAPS, for example, 1.5 ms, artifact may be suitably modeled as the sum of a single exponential plus a linear component, may more accurately estimate ECAP amplitude. If $V_i(t)$ is the recorded voltage waveform after averaging, the estimate of artifact A(t) may be obtained by optimally fitting the following equation to data $V_i(t)$:

$$A(t)=c_1 \exp(-t/\tau)+c_2 t+c_3$$

The fit may be performed by determining the minimum in the following error function over parameters c1, c2, c3, and τ:

$$E(c_1, c_2, c_3, \tau) = \sum_t (V(t) - A(t))^2$$

To solve this optimization problem, τ may be varied from 50 to 800 µs in 100 logarithmic steps. For each τ, E(τ) may be determined by solving the following closed-form matrix equation:

$$M = \begin{bmatrix} \exp\left(-\dfrac{t_0}{\tau}\right) & t_0 & 1 \\ \exp\left(-\dfrac{2t_0}{\tau}\right) & 2t_0 & 1 \\ \ldots & \ldots & \ldots \end{bmatrix}$$

$$C = (M'M)\backslash(M'V)$$

$$E(\tau) = \text{Norm}(V-MC)$$

In the above equation, to may be the sampling period, C is a 3×1 vector of optimal c coefficients, V may be a vector composed of measured samples V(t), and Norm may represent a norm-2 operation. Optimal τ may be determined to be one that produced the smallest E(τ); the equation above was utilized to compute the C coefficients. After the artifact model is determined, the N1-P2 amplitude may be calculated or estimated from the denoised waveform V(t)-A(t) using the same N1 and P2 windows as in the standard method.

In one or more examples, the processing circuitry 210 may also, or alternatively, use a high-pass filter (HP) method. For example, the stimulation artifact may contain lower-frequency content relative to the ECAP in the later portion of the biopotential recording (e.g., greater than 0.6 ms after the end of the stimulation pulse). As such, another approach for mitigating the stimulation artifact overlapping the ECAP may be application of a high pass or differentiator filter. Such a filter may have the following benefits. The first peak response of the differentiator occurs at the high-slope transition of the ECAP from N1 to P2. This response may be delayed relative to N1, the first feature of the ECAP used by the SM to estimate the ECAP, and results beneficially in extra temporal isolation between the signal and the artifact with the differentiator. In addition, a simple differentiator may be implemented in a very computationally efficient manner, an important consideration for battery powered implantable medical devices.

A comb filter with response $1-z^{-2}$ may be utilized as a differentiator for the acquired biopotentials. After application of the differentiator filter, the waveform may be smoothed (Kaiser, FIR 11 tap filter; cutoff 4.5 kHz). The ECAP response may be computed as the difference between the maximum output in the temporal window from approximately 0.6 to 0.85 ms to the minimum output in the window from approximately 0.9 to 1.125 ms. The temporal windows may be set using similar considerations to those employed with the standard method.

The processing circuitry 210 may also, or alternatively, use a correlation method (CM) which estimates spinal cord activation by correlating the acquired biopotential with a synthesized filter template, T(t). Specifically, the neural response may be computed as:

$$N_i = \sum_t T(t) * V_i(t - \Delta)$$

The template used here may have a mathematical expression of $T(t)=B(t) \sin(4\pi t/1.3)/N$ where, t is time in ms, B(t) is the Bartlett window, and N is the normalization factor, $N=\text{sum}(B(t)2 \sin(4\pi t/1.3)2)$ over a 1.3 ms window, for example. The template may approximate the morphology of a typical ECAP signal. A duration of 1.3 ms may be used to optimize the match of the template with the observed response. The template may be orthogonal to the first three components of a Taylor expansion of the artifact waveform, namely the constant term, the linear term and the quadratic term. Thus, when the template is applied to a waveform containing both neural response and artifact, the artifact component may be reduced. However, variable latencies in neural responses routinely occur due to the differences in conduction velocities across subjects and delay in action potential initiation across stimulation levels or pulse width. The template may be matched to the neural recording and Fourier techniques may be utilized accordingly to compute the optimal delay, $\Delta$.

$$A_i = \sum_t \frac{B(t)\sin(4\pi t/1.3)}{N} * V_i(t)$$

$$A_r = \sum_t \frac{B(t)\cos(4\pi t/1.3)}{N} * V_i(t)$$

$$\Delta(\text{ms}) = -\left(\frac{L(A_i + A_R 1 j)}{4\pi}\right) 1.3$$

In some examples, to account for variability in neural response latencies, while avoiding non-physiological shifts in the response, the system may prevent A from decreasing below 0 or increasing above 0.18 ms.

Once the ECAP characteristic value has been determined, the value may be used to determine an estimated neural threshold. A patient threshold of stimulation (for example, a perception threshold that represents the minimal stimulation current that causes a patient to feel the stimulation) may be correlated to the neural threshold. The determination of the threshold may be used to set stimulation parameters to maintain efficacious therapy in a closed-loop manner.

Figure 5:
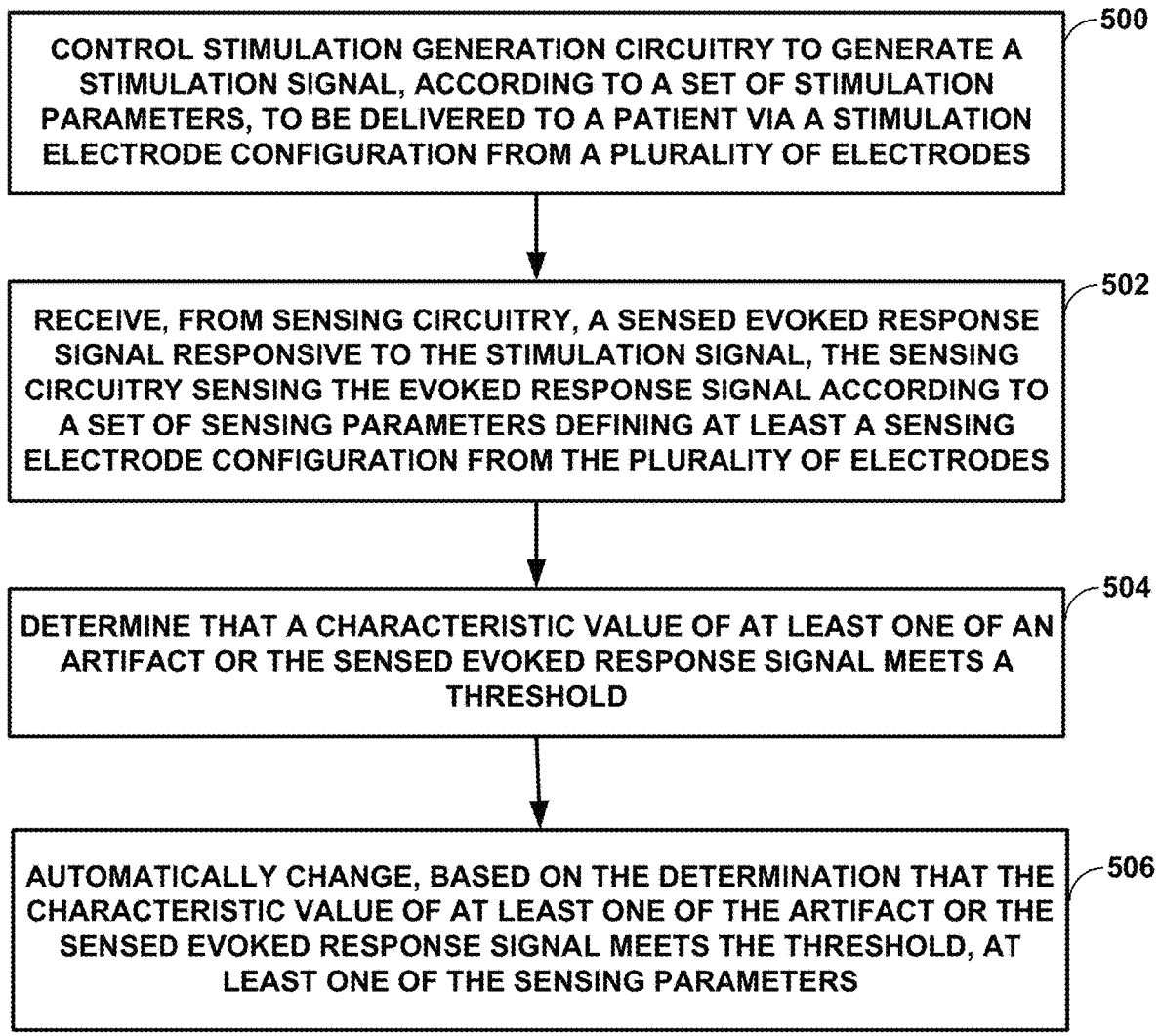
FIG. 5 is a flow diagram illustrating an example technique for changing at least one sensing electrode in accordance with one or more techniques of this disclosure.

FIG. 5 is a flow diagram illustrating an example technique for changing at least one sensing electrode in accordance with one or more techniques of this disclosure. Processing circuitry 210 may control stimulation generation circuitry 202 to generate a stimulation signal, according to a set of stimulation parameters (e.g., of stimulation parameter settings 242), to be delivered to target anatomy of patient 105 via a stimulation electrode configuration from a plurality of electrodes (e.g., electrodes 232 and/or electrodes 234) (500). For example, processing circuitry 210 may control stimulation generation circuitry 202 so as to cause stimulation generation circuitry to generate a stimulation signal which stimulation generation circuitry 202 may deliver to target tissue within patient 105.

Processing circuitry 210 may receive from sensing circuitry 206, a sensed evoked response signal responsive to the stimulation signal, sensing circuitry 206 sensing the sensed evoked response signal according to a set of sensing parameters defining at least a sensing electrode configuration from the plurality of electrodes (502). For example, sensing circuitry may sense an evoked response to the delivery of the stimulation signal by stimulation generation circuitry 202.

Processing circuitry 210 may determine that a characteristic value of at least one of an artifact or the sensed evoked response signal meet a threshold (504). For example, processing circuitry 210 may compare either the artifact, the sensed evoked response signal, or both to the threshold to determine if the threshold is met. The threshold may be met if it is equaled or exceeded. In some examples, the threshold may be predetermined. In other examples, the threshold may be dynamic and be based on stimulation parameters, sensing parameters, and/or the manner in which the characteristic value is determined.

Processing circuitry 210 may automatically change, based on the determination that the characteristic value of at the least one of the artifact or the sensed evoked response signal meets the threshold, at least one of the sensing parameters (506). For example, processing circuitry 210 may modify evoked response detection instructions 244 to sense the evoked response signal using at least one different electrode as a sensing electrode.

In some examples, the sensed evoked response signal is a first sensed evoked response signal, the characteristic value is a first characteristic value, and the artifact is a first artifact. In such examples, processing circuitry 210 may receive from the sensing circuitry a second sensed evoked response signal. Processing circuitry 210 may determine that a second characteristic value of at least one of a second artifact or the second sensed evoked response signal does not meet the threshold. Processing circuitry 210 may refrain from automatically changing, based on the determination that the second characteristic value of the at least one of a second artifact or the second sensed evoked response signal does not meet the threshold, the sensing parameters.

In some examples, processing circuitry 210 may change at least one sensing electrodes of the sensing electrode configuration based on the stimulation electrode configuration (e.g., based on which electrodes of the plurality of electrodes are the stimulation electrodes). In some examples processing circuitry 210 may change at least one sensing electrodes in the sensing electrode configuration to change at least one of a) a proximity of the at least one sensing electrode to the anatomy, b) a spacing between sensing electrodes, c) a spacing between sensing electrodes and stimulation electrodes, or d) an orientation of the at least one sensing electrode. In some examples, to change the proximity of the at least one sensing electrode to the anatomy, processing circuitry 210 may iteratively select electrodes for the sensing electrode configuration at positions further away from the target anatomy. In some examples, processing circuitry 210 changes at least one sensing electrode of the sensing electrode combination to select at least one electrode having a different orientation than at least one sensing electrode of the sensing electrode configuration by automatically searching the plurality of electrodes for a sensing electrode combination to minimize the amplitude of the artifact or maximize signal strength of the sensed evoked response signal.

In some examples, IMD 201 may sensing circuitry 206 includes artifact rejection circuitry (e.g., filter(s) 230). In some examples, processing circuitry 210 may adjust one or more of the stimulation parameters (e.g., of stimulation parameter settings 242) in response to an artifact in the sensed evoked response signal shifting in a sensing window. In some examples, processing circuitry 210 may adjust filter parameters (e.g., via filter(s)) of the sensed evoked response signal based on the artifact. In some examples, processing circuitry 210 may determine that the artifact or the sensed evoked response signal is more than a threshold different than an expected evoked signal and refrain from changing the stimulation parameters based on the sensed evoked response signal.

In some examples, processing circuitry 210 may determine a window for amplification (e.g., by amplifier(s) 232) of the sensed evoked response signal, the window having a duration. In some examples, processing circuitry 210 may weight at least one of temporal data within the window or calculated features of the temporal data within the window. In some examples, processing circuitry 210 may adjust averaging of at least one of the weighted temporal data or the weighted calculated features of the temporal data based on noise within the sensed evoked response signal.

In some examples, the sensed evoked response signal is a first sensed evoked response signal and the stimulation parameters comprise a polarity of the stimulation electrodes. In some examples, processing circuitry 210 change the polarity of the stimulation electrodes. In some examples, processing circuitry 210 may receive a second sensed evoked response signal from sensing circuitry 206 and average the first sensed evoked response signal and the second sensed evoked response signal to generate an averaged sensed evoked response signal. Processing circuitry 210 may adjust one or more parameters of the stimulation parameters based on the averaged sensed evoked response signal. In some examples, processing circuitry 210 may iteratively repeat changing the polarity of the stimulation electrodes, receiving the second sensed evoked response signal, averaging the first sensed evoked response signal and the second sensed evoked response signal, and adjusting one or more parameters of the set of stimulation parameters based on the averaged sensed evoked response signal.

In some examples, processing circuitry 210 may control stimulation generation circuitry 202 to deliver a probe pulse and a masker pulse, the masker pulse preceding the probe pulse in time and being configured to mask the neural response to the probe pulse. In some examples, the stimulation parameters include a number of interleaved pulses and processing circuitry 210 may determine that a current amplitude of the artifact is greater than a previous amplitude of the artifact and change a number of interleaved pulses, the interleaved pulses being configured to not elicit an evoked response.

In some examples, the stimulation parameters include at least one passive recharge setting, and processing circuitry 210 may change the at least one passive recharge setting based on a time constant of the artifact. In some examples, the stimulation parameters comprise a pulse shape, and processing circuitry 210 may change the pulse shape.

In some examples, processing circuitry 210 may change at least one factor that processing circuitry 210 uses to determine the characteristic value of the at least one of the artifact or the sensed evoked response signal. In some examples, processing circuitry 210 may change a window during which the sensed evoked response signal is sensed. In some examples, processing circuitry 210 may adjust one or more stimulation parameters of the set of stimulation parameters based on an evoked response in the sensed evoked response signal and control stimulation generation circuitry 202 to deliver subsequent stimulation according to the adjusted one or more stimulation parameters.

The techniques described in this disclosure may be implemented, at least in part, in hardware, software, firmware or any combination thereof. For example, various aspects of the described techniques may be implemented within one or more processors or processing circuitry, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various operations and functions described in this disclosure. For example, processing circuitry may conduct processing off-line and conduct automatic checks of patient ECAP signals and update programming from a remote location. In addition, any of the described units, circuits or components may be implemented together or separately as discrete but interoperable logic devices. Depiction of different features as circuits or units is intended to highlight different functional aspects and does not necessarily imply that such circuits or units must be realized by separate hardware or software components. Rather, functionality associated with one or more circuits or units may be performed by separate hardware or software components or integrated within common or separate hardware or software components.

The techniques described in this disclosure may also be embodied or encoded in a computer-readable medium, such as a computer-readable storage medium, containing instructions that may be described as non-transitory media. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

This disclosure includes the following non-limiting examples.

Example 1. A device comprising: stimulation generation circuitry configured to generate a stimulation signal, according to a set of stimulation parameters, to be delivered to target anatomy of a patient via a stimulation electrode configuration from a plurality of electrodes; sensing circuitry configured to sense an evoked response signal responsive to the stimulation signal according to a set of sensing parameters, the set of sensing parameters defining at least a sensing electrode configuration from the plurality of electrodes; processing circuitry communicatively coupled to the stimulation generation circuitry and the sensing circuitry, the processing circuitry being configured to: control the stimulation generation circuitry to generate the stimulation signal; receive from the sensing circuitry the sensed evoked response signal; determine that a characteristic value of at least one of an artifact or the sensed evoked response signal meets a threshold; and automatically change, based on the determination that the characteristic value of the at least one of the artifact or the sensed evoked response signal meets the threshold, at least one of the sensing parameters.

Example 2. The device of example 1, wherein the sensed evoked response signal is a first sensed evoked response signal, the characteristic value is a first characteristic value, and the artifact is a first artifact, and wherein the processing circuitry is further configured to: receive from the sensing circuitry a second sensed evoked response signal; determine that a second characteristic value of at least one of a second artifact or the second sensed evoked response signal does not meet the threshold; and refrain from automatically changing, based on the determination that the second characteristic value of the at least one of a second artifact or the second sensed evoked response signal does not meet the threshold, the sensing parameters.

Example 3. The device of example 1 or example 2, wherein to automatically change the at least one of the sensing parameters the processing circuitry is configured to change at least one sensing electrode of the sensing electrode configuration based the stimulation electrode configuration.

Example 4. The device of example 1 or example 2, wherein to automatically change the at least one of the sensing parameters the processing circuitry is configured to change at least one sensing electrode of the sensing electrode configuration to change at least one of a) a proximity of the at least one sensing electrode to the target anatomy, b) a spacing between sensing electrodes, c) a spacing between sensing electrodes and stimulation electrodes, or d) an orientation of the at least one sensing electrodes.

Example 5. The device of example 4, wherein the processing circuitry is configured to change the at least one sensing electrode of the sensing electrode configuration to change the proximity of the at least one sensing electrode to the target anatomy, and wherein as part of changing the proximity of the at least one sensing electrode to the target anatomy, the processing circuitry is configured to iteratively select electrodes for the sensing electrode configuration at positions further away from the target anatomy.

Example 6. The device of example 4, wherein the processing circuitry is configured to change at least one sensing electrode of the sensing electrode configuration to select at least one electrode having a different orientation than at least one sensing electrodes of the sensing electrode configuration, and wherein as part of selecting a different orientation of the at least one sensing electrode, the processing circuitry is configured to automatically search the plurality of electrodes for a sensing electrode combination to minimize an amplitude of the artifact or maximize signal strength of the sensed evoked response signal.

Example 7. The device of any of examples 1-6, wherein the sensing circuitry comprises artifact rejection circuitry, and wherein the processing circuitry is further configured to at least one of: adjust one or more parameters of the set of stimulation parameters in response to an artifact in the sensed evoked response signal shifting in a sensing window; adjust filtering parameters for the sensed evoked response signal based on the artifact; or determine that at least one of the artifact or the sensed evoked response signal is more than a difference threshold different than an expected evoked response signal and refrain from changing the stimulation parameters based on the sensed evoked response signal.

Example 8. The device of any of examples 1-7, wherein the sensing circuitry comprises amplification circuitry, and wherein the processing circuitry is further configured to: determine a window for amplification of the sensed evoked response signal, the window having a duration; weight at least one of temporal data within the window or calculated features of the temporal data within the window; and adjust averaging of at least one of the weighted temporal data or the weighted calculated features of the temporal data based on noise within the sensed evoked response signal.

Example 9. The device of any of examples 1-8, wherein the sensed evoked response signal is a first sensed evoked response signal, wherein the set of stimulation parameters comprise a polarity of stimulation electrodes of the stimulation electrode configuration, and wherein the processing circuitry is further configured to: change the polarity of the stimulation electrodes; receive a second sensed evoked response signal from the sensing circuitry; average the first sensed evoked response signal and the second sensed evoked response signal to generate an averaged sensed evoked response signal; and adjust one or more parameters of the set of stimulation parameters based on the averaged sensed evoked response signal.

Example 10. The device of example 9, wherein the processing circuitry is further configured to iteratively repeat changing the polarity of the stimulation electrodes, receiving the second sensed evoked response signal, averaging the first sensed evoked response signal and the second sensed evoked response signal, and adjusting one or more parameters of the set of stimulation parameters based on the averaged sensed evoked response signal.

Example 11. The device of any of examples 1-10, wherein the processing circuitry is further configured to control the stimulation generation circuitry to deliver a probe pulse and a masker pulse, the masker pulse preceding the probe pulse in time and being configured to mask the neural response to the probe pulse.

Example 12. The device of any of examples 1-11, wherein the set of stimulation parameters comprise a number of interleaved pulses and wherein the processing circuitry is further configured to: determine that an amplitude of the artifact is greater than a previous amplitude of the artifact; and change the number of interleaved pulses, the interleaved pulses being configured to not elicit an evoked response.

Example 13. The device of any of examples 1-12, wherein the set of stimulation parameters comprise at least one passive recharge setting, and wherein the processing circuitry is further configured to change the at least one passive recharge setting based on a time constant of the artifact.

Example 14. The device of any of examples 1-13, wherein the set of stimulation parameters comprise a pulse shape, and wherein the processing circuitry is further configured to change the pulse shape.

Example 15. The device of any of examples 1-14, wherein the processing circuitry is further configured to change at least one factor that the processing circuitry uses to determine the characteristic value of the at least one of the artifact or the sensed evoked response signal.

Example 16. The device of any of examples 1-15, wherein the processing circuitry is further configured to change a window during which the sensed evoked response signal is sensed.

Example 17. The device of any of examples 1-16, wherein the processing circuitry is further configured to: adjust one or more stimulation parameters of the set of stimulation parameters based on an evoked response in the sensed evoked response signal; and control the stimulation generation circuitry to deliver subsequent stimulation according to the adjusted one or more stimulation parameters.

Example 18. The device of any of examples 1-17, further comprising an implantable medical device comprising the processing circuitry.

Example 19. A method comprising: controlling, by processing circuitry, stimulation generation circuitry to generate a stimulation signal, according to a set of stimulation parameters, to be delivered to target anatomy of a patient via a stimulation electrode configuration from a plurality of electrodes; receiving, by processing circuitry and from sensing circuitry, a sensed evoked response signal responsive to the stimulation signal, the sensing circuitry sensing the sensed evoked response signal according to a set of sensing parameters defining at least a sensing electrode configuration from the plurality of electrodes; determining, by the processing circuitry, that a characteristic value of at least one of an artifact or the sensed evoked response signal meets a threshold; and automatically changing, by the processing circuitry and based on the determination that the characteristic value of the at least one of the artifact or the sensed evoked response signal meets the threshold, at least one of the sensing parameters.

Example 20. The method of example 19, wherein the sensed evoked response signal is a first sensed evoked response signal, the characteristic value is a first characteristic value, and the artifact is a first artifact, and wherein the method further comprises: receiving, by the processing circuitry and from the sensing circuitry, a second sensed evoked response signal; determining that a second characteristic value of at least one of a second artifact or the second sensed evoked response signal does not meet the threshold; and refraining from automatically changing, based on the determination that the second characteristic value of the at least one of a second artifact or the second sensed evoked response signal does not meet the threshold, the sensing parameters.

Example 21. The method of example 19 or example 20, wherein automatically changing the at least one of the sensing parameters comprises changing at least one sensing electrodes of the sensing electrode configuration based on the stimulation electrode configuration.

Example 22. The method of example 19 or example 20, wherein automatically changing the at least one of the sensing parameters comprises changing, by the processing circuitry, at least one sensing electrode of the sensing electrode configuration to change at least one of a) a proximity of the at least one sensing electrode to the target anatomy, b) a spacing between sensing electrodes, c) a spacing between sensing electrodes and stimulation electrodes, or d) an orientation of the at least one sensing electrode.

Example 23. The method of example 22, wherein changing the proximity of the at least one sensing electrode to the anatomy comprises iteratively selecting electrodes for the sensing electrode configuration at positions further away from the target anatomy.

Example 24. The method of example 22, wherein changing the orientation of the at least one sensing electrodes comprises changing at least one sensing electrode of the sensing electrode configuration to select at least one electrode having a different orientation than the at least one sensing electrode of the sensing electrode configuration by automatically searching the plurality of electrodes for a sensing electrode combination to minimize the amplitude of the artifact or maximize signal strength of the sensed evoked response signal.

Example 25. The method of any of examples 19-24, further comprising at least one of: adjusting, by the processing circuitry, one or more parameters of the set of stimulation parameters in response to an artifact in the sensed evoked response signal shifting in a sensing window; adjusting, by the processing circuitry, filtering parameters for the sensed evoked response signal based on the artifact; or determining, by the processing circuitry, that at least one of the artifact or the sensed evoked response signal is more than a threshold different than an expected evoked signal and refrain from changing the stimulation parameters based on the sensed evoked response signal.

Example 26. The method of any of examples 19-25, further comprising: determining, by the processing circuitry, a window for amplification of the sensed evoked response signal, the window having a duration; weighting, by the processing circuitry, at least one of temporal data within the window or calculated features of the temporal data within the window; and adjusting, by the processing circuitry, averaging of at least one of the weighted temporal data or the weighted calculated features of the temporal data based on noise within the sensed evoked response signal.

Example 27. The method of any of examples 19-26, wherein the sensed evoked response signal is a first sensed evoked response signal and wherein the set of stimulation parameters comprise a polarity of stimulation electrodes, the method further comprising: changing, by the processing circuitry, the polarity of the stimulation electrodes; receiving a second sensed evoked response signal from the sensing circuitry; and average the first sensed evoked response signal and the second sensed evoked response signal to generate an averaged sensed evoked response signal; and adjusting one or more parameters of the set of stimulation parameters based on the averaged sensed evoked response signal.

Example 28. The method of example 27, further comprising to iteratively repeating changing the polarity of the stimulation electrodes, receiving the second sensed evoked response signal, averaging the first sensed evoked response signal and the second sensed evoked response signal, and adjusting one or more parameters of the set of stimulation parameters based on the averaged sensed evoked response signal.

Example 29. The method of any of examples 19-28, further comprising controlling, by the processing circuitry, the stimulation generation circuitry to deliver a probe and a masker pulse, the masker pulse preceding the probe pulse in time and being configured to mask the neural response to the probe pulse.

Example 30. The method of any of examples 19-29, wherein the set of stimulation parameters comprise a number of interleaved pulses, the method further comprising: determining, by the processing circuitry, that an amplitude of the artifact is greater than a previous amplitude of the artifact; and changing, by the processing circuitry, the number of interleaved pulses, the interleaved pulses being configured to not elicit an evoked response.

Example 31. The method of any of examples 19-30, wherein the set of stimulation parameters comprise at least one passive recharge setting, the method further comprising changing, by the processing circuitry, the at least one passive recharge setting based on a time constant of the artifact.

Example 32. The method of any of examples 19-31, wherein the set of stimulation parameters comprise a pulse shape, the method further comprising changing, by the processing circuitry, the pulse shape.

Example 33. The method of any of examples 19-32, further comprising changing, by the processing circuitry, at least one factor that the processing circuitry uses to determine the characteristic value of the at least one of the artifact or the sensed evoked response signal.

Example 34. The method of any of examples 19-33, further comprising changing, by the processing circuitry, a window during which the sensed evoked response signal is sensed.

Example 35. The method of any of examples 19-24, further comprising: adjusting, by the processing circuitry, one or more stimulation parameters of the set of stimulation parameters based on an evoked response in the sensed evoked response signal; and controlling, by the processing circuitry, the stimulation generation circuitry to deliver subsequent stimulation according to the adjusted one or more stimulation parameters.

Example 36. A non-transitory computer-readable storage medium including instructions, which, when executed, cause processing circuitry to: control stimulation generation circuitry to generate a stimulation signal according to a set of stimulation parameters, to be delivered to target anatomy of a patient via a stimulation electrode configuration from a plurality of electrodes; receive from sensing circuitry, a sensed evoked response signal responsive to the stimulation signal, the sensing circuitry sensing the sensed evoked response signal according to a set of sensing parameters defining at least a sensing electrode configuration from the plurality of electrodes; determine that a characteristic value of at least one of an artifact or the sensed evoked response signal meets a threshold; and automatically change, based on the determination that the characteristic value of the at least one of the artifact or the sensed evoked response signal meets the threshold, at least one of the sensing parameters.

What is claimed is:

1. A device comprising:
   stimulation generation circuitry configured to generate a stimulation signal, according to a set of stimulation parameters, to be delivered to target anatomy of a patient via a stimulation electrode configuration from a plurality of electrodes;
   sensing circuitry configured to sense an evoked response signal responsive to the stimulation signal according to a set of sensing parameters, the set of sensing parameters defining at least a sensing electrode configuration from the plurality of electrodes;
   processing circuitry communicatively coupled to the stimulation generation circuitry and the sensing circuitry, the processing circuitry being configured to:
      control the stimulation generation circuitry to generate the stimulation signal;
      receive from the sensing circuitry the sensed evoked response signal;
      determine that a characteristic value of at least one of an artifact or the sensed evoked response signal meets a threshold; and
      automatically change, based on the determination that the characteristic value of the at least one of the artifact or the sensed evoked response signal meets the threshold, at least one of the sensing parameters, wherein to automatically change the at least one of the sensing parameters the processing circuitry is configured to change at least one sensing electrode of the sensing electrode configuration to change at least one of a) a proximity of the at least one sensing electrode to the target anatomy, b) a spacing between sensing electrodes, c) a spacing between sensing electrodes and stimulation electrodes, or d) an orientation of the at least one sensing electrodes.

2. The device of claim 1, wherein the sensed evoked response signal is a first sensed evoked response signal, the characteristic value is a first characteristic value, and the artifact is a first artifact, and wherein the processing circuitry is further configured to:
   receive from the sensing circuitry a second sensed evoked response signal;
   determine that a second characteristic value of at least one of a second artifact or the second sensed evoked response signal does not meet the threshold; and
   refrain from automatically changing, based on the determination that the second characteristic value of the at least one of a second artifact or the second sensed evoked response signal does not meet the threshold, the sensing parameters.

3. The device of claim 1, wherein to automatically change the at least one of the sensing parameters the processing circuitry is configured to change at least one sensing electrode of the sensing electrode configuration based the stimulation electrode configuration.

4. The device of claim 1, wherein the processing circuitry is configured to change the at least one sensing electrode of the sensing electrode configuration to change the proximity of the at least one sensing electrode to the target anatomy, and wherein as part of changing the proximity of the at least one sensing electrode to the target anatomy, the processing circuitry is configured to iteratively select electrodes for the sensing electrode configuration at positions further away from the target anatomy.

5. The device of claim 1, wherein the processing circuitry is configured to change at least one sensing electrode of the sensing electrode configuration to select at least one electrode having a different orientation than at least one sensing electrodes of the sensing electrode configuration, and wherein as part of selecting a different orientation of the at least one sensing electrode, the processing circuitry is configured to automatically search the plurality of electrodes for a sensing electrode combination to minimize an amplitude of the artifact or maximize signal strength of the sensed evoked response signal.

6. The device of claim 1, wherein the sensing circuitry comprises artifact rejection circuitry, and wherein the processing circuitry is further configured to at least one of:
   adjust one or more parameters of the set of stimulation parameters in response to an artifact in the sensed evoked response signal shifting in a sensing window;

adjust filtering parameters for the sensed evoked response signal based on the artifact; or determine that at least one of the artifact or the sensed evoked response signal is more than a difference threshold different than an expected evoked response signal and refrain from changing the stimulation parameters based on the sensed evoked response signal.

7. The device of claim 1, wherein the sensing circuitry comprises amplification circuitry, and wherein the processing circuitry is further configured to:

determine a window for amplification of the sensed evoked response signal, the window having a duration;

weight at least one of temporal data within the window or calculated features of the temporal data within the window; and adjust averaging of at least one of the weighted temporal data or the weighted calculated features of the temporal data based on noise within the sensed evoked response signal.

8. The device of claim 1, wherein the sensed evoked response signal is a first sensed evoked response signal, wherein the set of stimulation parameters comprise a polarity of stimulation electrodes of the stimulation electrode configuration, and wherein the processing circuitry is further configured to:

change the polarity of the stimulation electrodes;

receive a second sensed evoked response signal from the sensing circuitry;

average the first sensed evoked response signal and the second sensed evoked response signal to generate an averaged sensed evoked response signal; and adjust one or more parameters of the set of stimulation parameters based on the averaged sensed evoked response signal.

9. The device of claim 8, wherein the processing circuitry is further configured to iteratively repeat changing the polarity of the stimulation electrodes, receiving the second sensed evoked response signal, averaging the first sensed evoked response signal and the second sensed evoked response signal, and adjusting one or more parameters of the set of stimulation parameters based on the averaged sensed evoked response signal.

10. A method comprising:

controlling, by processing circuitry, stimulation generation circuitry to generate a stimulation signal, according to a set of stimulation parameters, to be delivered to target anatomy of a patient via a stimulation electrode configuration from a plurality of electrodes;

receiving, by processing circuitry and from sensing circuitry, a sensed evoked response signal responsive to the stimulation signal, the sensing circuitry sensing the sensed evoked response signal according to a set of sensing parameters defining at least a sensing electrode configuration from the plurality of electrodes;

determining, by the processing circuitry, that a characteristic value of at least one of an artifact or the sensed evoked response signal meets a threshold; and automatically changing, by the processing circuitry and based on the determination that the characteristic value of the at least one of the artifact or the sensed evoked response signal meets the threshold, at least one of the sensing parameters, wherein automatically changing the at least one of the sensing parameters comprises changing, by the processing circuitry, at least one sensing electrode of the sensing electrode configuration to change at least one of a) a proximity of the at least one sensing electrode to the target anatomy, b) a spacing between sensing electrodes, c) a spacing between sensing electrodes and stimulation electrodes, or d) an orientation of the at least one sensing electrode.

11. The method of claim 10, wherein the sensed evoked response signal is a first sensed evoked response signal, the characteristic value is a first characteristic value, and the artifact is a first artifact, and wherein the method further comprises:

receiving, by the processing circuitry and from the sensing circuitry, a second sensed evoked response signal;

determining that a second characteristic value of at least one of a second artifact or the second sensed evoked response signal does not meet the threshold; and refraining from automatically changing, based on the determination that the second characteristic value of the at least one of a second artifact or the second sensed evoked response signal does not meet the threshold, the sensing parameters.

12. The method of claim 10, wherein automatically changing the at least one of the sensing parameters comprises changing at least one sensing electrodes of the sensing electrode configuration based on the stimulation electrode configuration.

13. The method of claim 10, wherein changing the proximity of the at least one sensing electrode to the anatomy comprises iteratively selecting electrodes for the sensing electrode configuration at positions further away from the target anatomy.

14. The method of claim 10, wherein changing the orientation of the at least one sensing electrodes comprises changing at least one sensing electrode of the sensing electrode configuration to select at least one electrode having a different orientation than the at least one sensing electrode of the sensing electrode configuration by automatically searching the plurality of electrodes for a sensing electrode combination to minimize an amplitude of the artifact or maximize signal strength of the sensed evoked response signal.

15. The method of claim 10, further comprising at least one of:

adjusting, by the processing circuitry, one or more parameters of the set of stimulation parameters in response to an artifact in the sensed evoked response signal shifting in a sensing window;

adjusting, by the processing circuitry, filtering parameters for the sensed evoked response signal based on the artifact; or determining, by the processing circuitry, that at least one of the artifact or the sensed evoked response signal is more than a threshold different than an expected evoked signal and refrain from changing the stimulation parameters based on the sensed evoked response signal.

16. The method of claim 10, further comprising:

determining, by the processing circuitry, a window for amplification of the sensed evoked response signal, the window having a duration;

weighting, by the processing circuitry, at least one of temporal data within the window or calculated features of the temporal data within the window; and adjusting, by the processing circuitry, averaging of at least one of the weighted temporal data or the weighted calculated features of the temporal data based on noise within the sensed evoked response signal.

17. The method of claim 10, wherein the sensed evoked response signal is a first sensed evoked response signal and wherein the set of stimulation parameters comprise a polarity of stimulation electrodes, the method further comprising:

changing, by the processing circuitry, the polarity of the stimulation electrodes;

receiving a second sensed evoked response signal from the sensing circuitry; and average the first sensed evoked response signal and the second sensed evoked response signal to generate an averaged sensed evoked response signal; and adjusting one or more parameters of the set of stimulation parameters based on the averaged sensed evoked response signal.

18. A non-transitory computer-readable storage medium including instructions, which, when executed, cause processing circuitry to:

control stimulation generation circuitry to generate a stimulation signal according to a set of stimulation parameters, to be delivered to target anatomy of a patient via a stimulation electrode configuration from a plurality of electrodes;

receive from sensing circuitry, a sensed evoked response signal responsive to the stimulation signal, the sensing circuitry sensing the sensed evoked response signal according to a set of sensing parameters defining at least a sensing electrode configuration from the plurality of electrodes;

determine that a characteristic value of at least one of an artifact or the sensed evoked response signal meets a threshold; and automatically change, based on the determination that the characteristic value of the at least one of the artifact or the sensed evoked response signal meets the threshold, at least one of the sensing parameters, wherein to automatically change the at least one of the sensing parameters the instructions cause the processing circuitry to change at least one sensing electrode of the sensing electrode configuration to change at least one of a) a proximity of the at least one sensing electrode to the target anatomy, b) a spacing between sensing electrodes, c) a spacing between sensing electrodes and stimulation electrodes, or d) an orientation of the at least one sensing electrodes.

* * * * *